United States Patent
Kitayama et al.

(10) Patent No.: US 9,803,078 B2
(45) Date of Patent: *Oct. 31, 2017

(54) OPTICAL RESIN COMPOSITION AND FILM

(71) Applicant: KANEKA CORPORATION, Osaka-shi, Osaka (JP)

(72) Inventors: Fuminobu Kitayama, Hyogo (JP); Haruki Koyama, Osaka (JP)

(73) Assignee: KANEKA CORPORATION, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/100,183

(22) PCT Filed: Nov. 27, 2014

(86) PCT No.: PCT/JP2014/005935
§ 371 (c)(1),
(2) Date: May 27, 2016

(87) PCT Pub. No.: WO2015/079693
PCT Pub. Date: Jun. 4, 2015

(65) Prior Publication Data
US 2017/0022354 A1 Jan. 26, 2017

(30) Foreign Application Priority Data
Nov. 29, 2013 (JP) .................. 2013-248092

(51) Int. Cl.
C08L 33/24 (2006.01)
C08J 5/18 (2006.01)
C08L 35/02 (2006.01)
C08L 33/26 (2006.01)

(52) U.S. Cl.
CPC .............. *C08L 33/24* (2013.01); *C08J 5/18* (2013.01); *C08L 33/26* (2013.01); *C08L 35/02* (2013.01); *C08J 2333/24* (2013.01); *C08J 2333/26* (2013.01); *C08J 2335/02* (2013.01); *C08J 2433/12* (2013.01); *C08J 2433/26* (2013.01); *C08J 2435/02* (2013.01); *C08J 2451/00* (2013.01); *C08L 2201/10* (2013.01); *C08L 2205/03* (2013.01)

(58) Field of Classification Search
CPC .......... C08L 33/24; C08L 35/02; C08L 33/26; C08L 2201/10; C08J 5/18; C08J 5/2433; C08J 5/12; C08J 2333/26; C08J 2433/26; C08J 2451/00; C08J 2435/02; C08J 2333/24
See application file for complete search history.

(56) References Cited

U.S. PATENT DOCUMENTS

| | | | |
|---|---|---|---|
| 4,373,065 A | 2/1983 | Prest, Jr. | |
| 6,201,045 B1 | 3/2001 | Koike | |
| 6,586,515 B1 | 7/2003 | Koike | |
| 2005/0119389 A1 | 6/2005 | Koike | |
| 2009/0306321 A1 | 12/2009 | Koike | |
| 2014/0045995 A1 | 2/2014 | Shimamoto et al. | |
| 2016/0297958 A1* | 10/2016 | Kitayama et al. | .... C08F 265/06 |
| 2016/0319121 A1* | 11/2016 | Kitayama | ............ C08F 220/54 |
| 2017/0031058 A1* | 2/2017 | Kitayama et al. | ......... C08J 5/18 |

FOREIGN PATENT DOCUMENTS

| | | |
|---|---|---|
| CN | 1902240 A | 1/2007 |
| CN | 1946794 A | 4/2007 |
| CN | 103380175 | 10/2013 |
| JP | S63122748 A | 5/1988 |
| JP | 2002023363 | 1/2002 |
| JP | 2005023272 | 1/2005 |
| JP | 3648201 B | 5/2005 |
| JP | 3696649 B | 9/2005 |
| JP | 2006124592 | 5/2006 |
| JP | 2006308682 | 11/2006 |
| JP | 2007191706 | 8/2007 |

(Continued)

OTHER PUBLICATIONS

International Search Report for PCT/JP2014/005935, dated Mar. 3, 2015, 5 pages including English translation.
International Preliminary Report on Patentability issued in International Application No. PCT/JP2014/005935, May 31, 2016, 4 pages.
Office Action issued for corresponding Chinese Patent Application No. 201480063896.6, dated Feb. 3, 2017, 12 pages including partial English translation.
International Search Report issued in International Application No. PCT/JP2014/005855, Feb. 24, 2015, 3 pages.
International Preliminary Report on Patentability issued in International Application No. PCT/JP2014/005855, May 24, 2016, 13 pages.

(Continued)

*Primary Examiner* — Nathan M Nutter
(74) *Attorney, Agent, or Firm* — Hamre, Schumann, Mueller & Larson, P.C.

(57) ABSTRACT

Disclosed herein are an optical resin composition whose orientation birefringence and photoelastic birefringence are both very low and which has high transparency and which provides a film having few surface defects, high heat stability, high solvent resistance, and excellent surface appearance, and a film comprising the optical resin composition. The optical resin composition comprises: a resin (A) having a maleimide unit represented by the formula (5) and a (meth)acrylic ester unit; and a glutarimide acrylic resin (B). The resin composition may further comprise multi-layered particles.

(5)

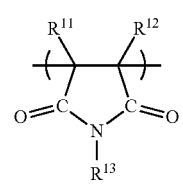

25 Claims, No Drawings

(56) References Cited

FOREIGN PATENT DOCUMENTS

| | | |
|---|---|---|
| JP | 2007254727 | 10/2007 |
| JP | 2008179778 | 8/2008 |
| JP | 2008276207 A | 11/2008 |
| JP | 4336586 | 9/2009 |
| JP | 2009203348 | 9/2009 |
| JP | 2009203434 | 9/2009 |
| JP | 2009203435 | 9/2009 |
| JP | 2009204860 | 9/2009 |
| JP | 2009269975 | 11/2009 |
| JP | 2009293021 | 12/2009 |
| JP | 2010096919 | 4/2010 |
| JP | 2010202798 | 9/2010 |
| JP | 4624845 B | 2/2011 |
| JP | 2012255128 | 12/2012 |
| JP | 5142938 | 2/2013 |
| JP | 2013040325 | 2/2013 |
| JP | 2013204025 | 10/2013 |
| WO | 2010119730 | 10/2010 |
| WO | 2012141413 | 10/2012 |
| WO | 2014002491 | 1/2014 |
| WO | 2014/162369 | 10/2014 |

OTHER PUBLICATIONS

International Preliminary Report on Patentability issued in International Application No. PCT/JP2014/005936, May 31, 2016, 8 pages.
International Search Report for PCT/JP2014/005936, dated Mar. 3, 2015, 5 pages including English translation.
International Search Report mailed Mar. 31, 2015, issued in International Application No. PCT/JP2014/083787, with English translation (5 pages).
Written Opinion of the International Searching Authority mailed Mar. 31, 2015, issued in International Application No. PCT/JP2014/083787, with English translation (9 pages).
PCT International Preliminary Report on Patentability issued Jun. 28, 2016, by the International Bureau of WIPO in International Application No. PCT/JP2014/083787, with English translation (11 pages).
Extended European Search Report for European Patent Application No. 14865247.2, dated Jun. 12, 2017, 6 pages.
Office Action issued for counterpart Chinese Patent Application No. 201480063589.8, dated Jul. 5, 2017, 18 pages including partial English translation.
Extended European Search Report issued for European Patent Application No. 14873372.8, dated Jul. 28, 2017, 7 pages.

* cited by examiner

OPTICAL RESIN COMPOSITION AND FILM

TECHNICAL FIELD

The present invention relates to an optical resin composition and a film.

BACKGROUND ART

Light-permeable resins are widely used as materials for forming film-, plate-, and lens-like optical members for use in various optical devices (e.g., films, substrates, and prism sheets for use in liquid crystal display devices; lenses in lens systems for signal reading of optical disk devices; Fresnel lenses and lenticular lenses for projection screens). Such resins are generally called "optical resins" or "optical polymers".

Birefringence is one of important optical characteristics that should be taken into consideration when optical resins are used to form optical members. Particularly, in the above-mentioned applications (liquid crystal display devices, optical disk devices, projection screens, etc.), the presence of a birefringent film or lens in an optical path adversely affects image quality or signal reading performance, and therefore the use of an optical member made of an optical resin whose birefringence is as low as possible is desired. Needless to say, camera lenses, eyeglass lenses, and the like also preferably have low birefringence.

Birefringence of an optical polymer includes "orientation birefringence" mainly caused by the orientation of main chains of the polymer and "photoelastic birefringence" caused by stress. Orientation birefringence and photoelastic birefringence have their respective signs that depend on the chemical structure of a polymer, and are properties intrinsic to individual polymers.

Orientation birefringence generally develops when main chains of a chain-like polymer (polymer chains) are oriented, and this orientation of main chains occurs in a process involving the flowing of a material, such as an extrusion-molding or stretching process during production of a polymer film or an injection molding process frequently used for production of optical members with various shapes, and is fixed and remains in an optical member. Hereinafter, the phrase "orientation birefringence is positive" means that a refractive index is large in a direction parallel to the orientation direction of polymer chains, and the phrase "orientation birefringence is negative" means that a refractive index is large in a direction orthogonal to the orientation direction of polymer chains.

Photoelastic birefringence is caused by elastic deformation (distortion) of a polymer. In the case of an optical member using a polymer, elastic deformation (distortion) occurs and remains in its material due to, for example, volume contraction caused by cooling from a temperature around the glass transition temperature of the polymer to a temperature lower than that, which becomes the cause of photoelastic birefringence. Further, the material is elastically deformed also by, for example, external force exerted on the optical member fixed to a device used at ordinary temperature (glass transition temperature or lower), which causes photoelastic birefringence. As shown by the following formula, a photoelastic constant is defined as a coefficient $\gamma$ of $\Delta\sigma$ when a birefringence difference $\Delta n$ is caused by a stress difference $\Delta\sigma$.

$$\Delta n = \gamma \Delta \sigma$$

Hereinafter, the phrase "photoelastic birefringence is positive" means that a refractive index is large in a direction parallel to a direction in which tensile stress is applied (direction in which polymer chains are oriented), and the phrase "photoelastic birefringence is negative" means that a refractive index is large in a direction orthogonal to a direction in which tensile stress is applied.

Various attempts to suppress the above-described birefringence have been reported.

For example, Patent Literature 1 discloses a non-birefringent optical resin material obtained by blending two polymer resins that are opposite in the sign of orientation birefringence to each other and are completely miscible. However, it is difficult to uniformly mix the two polymer resins described in Patent Literature 1 to obtain a practical polymer resin that uniformly exhibits low orientation birefringence as a whole, and aggregates of the polymer resins may cause foreign matter defects. Further, the polymer resins blended are different in their intrinsic refractive index, and therefore light scattering occurs due to non-uniformity of refractive index, which makes it impossible to obtain an optical material excellent in transparency. Although there is no description about photoelastic birefringence, it is conceivable that a polymer composition of Example will have significantly high photoelastic birefringence.

Patent Literature 2 discloses a method for obtaining a non-birefringent optical resin material by adding, to a matrix composed of a transparent polymer resin, a low-molecular material whose orientation birefringence tends to cancel out the orientation birefringence of the polymer resin material. The low-molecular material has a molecular weight of 5000 or less, and a resulting molded body has excellent transparency. However, there is no description about photoelastic birefringence. Further, there is a case where heat resistance is reduced.

Patent Literature 3 discloses a method for obtaining an optical resin material having low orientation birefringence by adding, to a transparent polymer resin, a birefringent fine inorganic substance that is oriented in the same direction as the linked chains of the polymer resin as the polymer resin is oriented by the application of external force. Orientation birefringence can be suppressed also by this method, but there is no description about improvement in photoelastic birefringence. Further, it is difficult to uniformly disperse the fine inorganic substance, and there is a case where the optical resin material is poor in transparency.

Patent Literature 4 discloses a method for obtaining a non-birefringent optical resin material having low orientation birefringence and low photoelastic birefringence, in which an optical material having a multicomponent system of three or more components including a binary or higher copolymerization system is obtained by selecting the combination and constituent ratio (compositional ratio) of components of the multicomponent system so that both the orientation birefringence and photoelastic birefringence of the optical material are cancelled out at the same time. This method makes it possible to extremely reduce both orientation birefringence and photoelastic birefringence at the same time, which could not heretofore be achieved. However, the composition of the optical resin material is limited to some extent to make it possible to cancel out both orientation birefringence and photoelastic birefringence at the same time, and therefore the glass transition temperature of the optical resin material is as low as less than 100° C. and there is a problem such as a reduction in mechanical strength. Further, there may be a problem that polymer decomposition or the like occurs during molding performed under such conditions that the optical resin material is retained at high temperature, such as melt-extrusion molding for forming film.

CITATION LIST

Patent Literatures

PTL 1: U.S. Pat. No. 4,373,065
PTL 2: Japanese Patent No. 3696649
PTL 3: Japanese Patent No. 3648201
PTL 4: Japanese Patent No. 4624845

SUMMARY OF INVENTION

Technical Problem

It is an object of the present invention to provide an optical resin composition that is very low in both orientation birefringence and photoelastic birefringence, has high transparency, and provides a film having few surface defects, high heat stability, high solvent resistance, and excellent surface appearance, and a film comprising such an optical resin composition. It is also an object of the present invention to provide a film that has optical isotropy and excellent transparency even after stretching.

Solution to Problem

The present inventors have found that the above objects can be achieved by using a mixture of a maleimide acrylic resin and a glutarimide acrylic resin, which has led to the completion of the present invention.

Specifically, the present invention is directed to an optical resin composition comprising:

a resin (A) having a maleimide unit represented by the following general formula (5) and a (meth)acrylic ester unit; and a glutarimide acrylic resin (B):

[Chemical Formula 1]

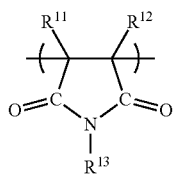

(5)

wherein $R^{11}$ and $R^{12}$ are each independently a hydrogen atom, an alkyl group having 1 to 12 carbon atoms, or an aryl group having 6 to 14 carbon atoms, and
$R^{13}$ is a hydrogen atom, an arylalkyl group having 7 to 14 carbon atoms, an aryl group having 6 to 14 carbon atoms, a cycloalkyl group having 3 to 12 carbon atoms, an alkyl group having 1 to 18 carbon atoms, or an aryl group having 6 to 14 carbon atoms or an alkyl group having 1 to 12 carbon atoms which has at least one substituent group selected from the following group A, group A: halogen atom, hydroxyl group, nitro group, alkoxy group having 1 to 12 carbon atoms, alkyl group having 1 to 12 carbon atoms, and arylalkyl group having 7 to 14 carbon atoms.

It is preferred that the glutarimide acrylic resin (B) has a unit represented by the following general formula (1):

[Chemical Formula 2]

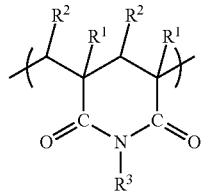

(1)

wherein $R^1$ and $R^2$ are each independently hydrogen or an alkyl group having 1 to 8 carbon atoms and $R^3$ is hydrogen, an alkyl group having 1 to 18 carbon atoms, a cycloalkyl group having 3 to 12 carbon atoms, or an aromatic ring-containing substituent group having 5 to 15 carbon atoms; and a unit represented by the following general formula (2):

[Chemical Formula 3]

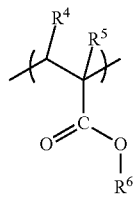

(2)

wherein $R^4$ and $R^5$ are each independently hydrogen or an alkyl group having 1 to 8 carbon atoms and $R^6$ is an alkyl group having 1 to 18 carbon atoms, a cycloalkyl group having 3 to 12 carbon atoms, or an aromatic ring-containing substituent group having 5 to 15 carbon atoms.

It is preferred that the resin (A) further has a unit represented by the following general formula (3):

[Chemical Formula 4]

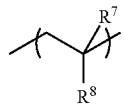

(3)

wherein $R^7$ is hydrogen or an alkyl group having 1 to 8 carbon atoms and $R^8$ is an aryl group having 6 to 10 carbon atoms.

It is preferred that the resin (A) is contained in an amount of 1 to 99 parts by weight per 100 parts by weight of a total amount of the resin (A) and the resin (B).

It is preferred that the optical resin composition according to the present invention further comprises multi-layered particles.

It is preferred that the multi-layered particles are acrylic rubber particles.

It is preferred that a photoelastic constant of the resin (A) and a photoelastic constant of the glutarimide acrylic resin (B) are opposite in sign.

It is preferred that an orientation birefringence of the resin (A) and an orientation birefringence of the glutarimide acrylic resin (B) are opposite in sign.

It is preferred that when a molded body (thickness: 125 µm) of a mixed resin comprising the resin (A) and the glutarimide acrylic resin (B) is prepared, the molded body has a haze of 2% or less.

It is preferred that a photoelastic constant of the mixed resin comprising the resin (A) and the glutarimide acrylic resin (B) is $-10\times10^{-12}$ to $+10\times10^{-12}$ $Pa^{-1}$.

It is preferred that an orientation birefringence of the mixed resin comprising the resin (A) and the glutarimide acrylic resin (B) is $-15\times10^{-4}$ to $+15\times10^{-4}$.

It is preferred that the multi-layered particles have a polymer layer containing, as a structural unit, a vinyl-based monomer having, as a ring structure, an alicyclic structure, a heterocyclic structure, or an aromatic group.

It is preferred that the multi-layered particles have a polymer layer containing, as a structural unit, a monomer represented by a formula (4) that will be described later.

It is preferred that the polymer layer contains, as a structural unit, (meth)acrylic acid and/or a salt thereof.

It is preferred that a molded body (125 μm thick) made of the optical resin composition has a total light transmittance of 85% or more.

It is preferred that a molded body (125 μm thick) made of the optical resin composition has a haze of 2% or less.

The present invention is also directed to a pellet obtained by heat-melting the optical resin composition.

The present invention is also directed to a molded body or a film made of the optical resin composition.

It is preferred that the film is formed by melt-extrusion molding.

It is preferred that the film has a thickness of 10 to 500 μm.

It is preferred that the film is an optical film.

The present invention is also directed to a stretched film obtained by stretching the film.

It is preferred that the stretched film has a thickness of 10 to 500 μm.

It is preferred that the stretched film has a photoelastic constant of $-4\times10^{-12}$ to $+4\times10^{-12}$ $Pa^{-1}$.

It is preferred that the stretched film has an orientation birefringence of $-5\times10^{-4}$ to $+5\times10^{-4}$.

Advantageous Effects of Invention

According to the present invention, it is possible to provide an optical resin composition that is very low in both orientation birefringence and photoelastic birefringence, has high transparency, and provides a film having few surface defects, high heat stability, high solvent resistance, and excellent surface appearance, and a film comprising the optical resin composition. Further, the film comprising the optical resin composition according to the present invention can have optical isotropy and excellent transparency even after stretching.

DESCRIPTION OF EMBODIMENTS

Hereinbelow, embodiments of the present invention will be described in detail, but the present invention is not limited to these embodiments.

An optical resin composition according to the present invention contains, as essential components, at least two resins, that is, a resin (A) and a resin (B). The resin (A) and the resin (B) are highly miscible, and therefore when they are used in combination, their excellent transparency can be maintained, both low orientation birefringence and low photoelastic birefringence are achieved, and high heat stability and high solvent resistance can also be maintained.

(Resin (A))

The resin (A) is a copolymer having a maleimide unit represented by the following general formula (5):

[Chemical Formula 5]

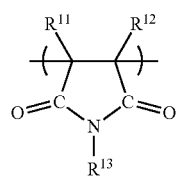

and a (meth)acrylic ester unit.

In the above general formula (5), $R^{11}$ and $R^{12}$ are each independently a hydrogen atom, an alkyl group having 1 to 12 carbon atoms, or an aryl group having 6 to 14 carbon atoms, and $R^{13}$ is a hydrogen atom, an arylalkyl group having 7 to 14 carbon atoms, an aryl group having 6 to 14 carbon atoms, a cycloalkyl group having 3 to 12 carbon atoms, an alkyl group having 1 to 18 carbon atoms, or an aryl group having 6 to 14 carbon atoms or an alkyl group having 1 to 12 carbon atoms which has at least one substituent group selected from the following group A, group A: halogen atom, hydroxyl group, nitro group, alkoxy group having 1 to 12 carbon atoms, alkyl group having 1 to 12 carbon atoms, and arylalkyl group having 7 to 14 carbon atoms.

<$R^{11}$ and $R^{12}$>

The alkyl group having 1 to 12 carbon atoms as $R^{11}$ and $R^{12}$ is preferably an alkyl group having 1 to 6 carbon atoms, more preferably an alkyl group having 1 to 4 carbon atoms. Examples of the alkyl group having 1 to 12 carbon atoms as $R^{11}$ and $R^{12}$ include a methyl group, an ethyl group, a n-propyl group, an isopropyl group, a n-butyl group, an isobutyl group, a t-butyl group, a 2-ethylhexyl group, a nonyl group, a decanyl group, and a lauryl group. Among them, from the viewpoint of further improving transparency and weather resistance, a methyl group, an ethyl group, a n-propyl group, an isopropyl group, a n-butyl group, an isobutyl group, a t-butyl group, and a 2-ethylhexyl group are preferred, and a methyl group is more preferred.

Examples of the aryl group having 6 to 14 carbon atoms as $R^{11}$ and $R^{12}$ include a phenyl group, a naphthyl group, and an anthracenyl group. Among them, from the viewpoint of further improving heat resistance and optical characteristics such as low birefringence, a phenyl group is preferred.

$R^{11}$ and $R^{12}$ are preferably a hydrogen atom, an alkyl group having 1 to 4 carbon atoms, or a phenyl group, more preferably a hydrogen atom.

<$R^{13}$>

Examples of the arylalkyl group having 7 to 14 carbon atoms as $R^{13}$ include a benzyl group, a 1-phenylethyl group, a 2-phenylethyl group, a 3-phenylpropyl group, a 6-phenylhexyl group, and an 8-phenyloctyl group. Among them, from the viewpoint of further improving heat resistance and optical characteristics such as low birefringence, a benzyl group is preferred.

Examples of the aryl group having 6 to 14 carbon atoms as $R^{13}$ include a phenyl group, a naphthyl group, and an anthracenyl group. Among them, from the viewpoint of further improving heat resistance and optical characteristics such as low birefringence, a phenyl group is preferred.

$R^{13}$ may be an aryl group having 6 to 14 carbon atoms and a substituent group. Here, the substituent group is selected from a group (group A) consisting of a halogen atom, a hydroxyl group, a nitro group, an alkoxy group having 1 to 12 carbon atoms, an alkyl group having 1 to 12 carbon atoms, and an arylalkyl group having 7 to 14 carbon atoms.

Examples of the halogen atom as the substituent group include a fluorine atom, a chlorine atom, a bromine atom, and an iodine atom.

The alkoxy group having 1 to 12 carbon atoms as the substituent group is preferably an alkoxy group having 1 to 10 carbon atoms, more preferably an alkoxy group having 1 to 8 carbon atoms. Examples of the alkoxy group having 1 to 12 carbon atoms as the substituent group include a methoxy group, an ethoxy group, a n-propyloxy group, an isopropyloxy group, a n-butyloxy group, an isobutyloxy group, a t-butyloxy group, a 2-ethylhexyloxy group, a 1-decyloxy group, and a 1-dodecyloxy group.

Examples of the alkyl group having 1 to 12 carbon atoms as the substituent group include a methyl group, an ethyl group, a n-propyl group, an isopropyl group, a n-butyl group, an isobutyl group, a t-butyl group, a 2-ethylhexyl group, a nonyl group, a decanyl group, and a lauryl group. Among them, from the viewpoint of further improving transparency and weather resistance, a methyl group, an ethyl group, a n-propyl group, an isopropyl group, a n-butyl group, an isobutyl group, a t-butyl group, and a 2-ethylhexyl group are preferred, and a methyl group is more preferred.

Examples of the arylalkyl group having 7 to 14 carbon atoms as the substituent group include a benzyl group, a 1-phenylethyl group, a 2-phenylethyl group, a 3-phenylpropyl group, a 6-phenylhexyl group, and an 8-phenyloctyl group. Among them, a benzyl group, a 1-phenylethyl group, a 2-phenylethyl group, and a 3-phenylpropyl group are preferred.

The aryl group having 6 to 14 carbon atoms and a substituent group as $R^{13}$ is preferably a phenyl group having a substituent group or a naphthyl group having a substituent group. Examples of the aryl group having 6 to 14 carbon atoms and a substituent group include a 2,4,6-tribromophenyl group, a 2-chlorophenyl group, a 4-chlorophenyl group, a 2-bromophenyl group, a 4-bromophenyl group, a 2-methylphenyl group, a 4-methylphenyl group, a 2-ethylphenyl group, a 4-ethylphenyl group, a 2-methoxyphenyl group, a 4-methoxyphenyl group, a 2-nitrophenyl group, a 4-nitrophenyl group, and a 2,4,6-trimethylphenyl group. Among them, from the viewpoint of imparting flame retardancy, a 2,4,6-tribromophenyl group is preferred.

Examples of the cycloalkyl group having 3 to 12 carbon atoms as $R^{13}$ include a cyclopropyl group, a cyclobutyl group, a cyclopentyl group, a cyclohexyl group, a cycloheptyl group, a cyclooctyl group, a tricyclodecyl group, a bicyclooctyl group, a tricyclododecyl group, an isobornyl group, an adamantyl group, and a tetracyclododecyl group. Among them, a cyclopropyl group, a cyclobutyl group, a cyclopentyl group, a cyclohexyl group, a cycloheptyl group, and a cyclooctyl group are preferred, and from the viewpoint of further improving weather resistance and optical characteristics such as transparency and imparting low water absorbability, a cyclohexyl group is more preferred.

The alkyl group having 1 to 18 carbon atoms as $R^{13}$ is preferably an alkyl group having 1 to 10 carbon atoms, more preferably an alkyl group having 1 to 8 carbon atoms. Examples of the alkyl group having 1 to 18 carbon atoms as $R^{13}$ include a methyl group, an ethyl group, a n-propyl group, an isopropyl group, a n-butyl group, an isobutyl group, a t-butyl group, a n-pentyl group, a n-hexyl group, a n-octyl group, a n-dodecyl group, a n-octadecyl group, a 2-ethylhexyl group, a 1-decyl group, and a 1-dodecyl group. Among them, from the viewpoint of further improving weather resistance and optical characteristics such as transparency, a methyl group, an ethyl group, and an isopropyl group are preferred.

$R^{13}$ may be an alkyl group having 1 to 12 carbon atoms and a substituent group. Here, the substituent group is selected from a group (group A) consisting of a halogen atom, a hydroxyl group, a nitro group, and an alkoxy group having 1 to 12 carbon atoms.

Examples of the halogen atom as the substituent group include a fluorine atom, a chlorine atom, a bromine atom, and an iodine atom.

The alkoxy group having 1 to 12 carbon atoms as the substituent group is preferably an alkoxy group having 1 to 10 carbon atoms, more preferably an alkoxy group having 1 to 8 carbon atoms. Examples of the alkoxy group having 1 to 12 carbon atoms as the substituent group include a methoxy group, an ethoxy group, a n-propyloxy group, an isopropyloxy group, a n-butyloxy group, an isobutyloxy group, a t-butyloxy group, a 2-ethylhexyloxy group, a 1-decyloxy group, and a 1-dodecyloxy group.

Examples of the alkyl group having 1 to 12 carbon atoms and a substituent group as $R^{13}$ include a dichloromethyl group, a trichloromethyl group, a trifluoroethyl group, and a hydroxyethyl group. Among them, a trifluoroethyl group is preferred.

Specific examples of the maleimide unit represented by the general formula (5) include an unsubstituted maleimide unit, an N-methylmaleimide unit, an N-phenylmaleimide unit, an N-cyclohexylmaleimide unit, and an N-benzylmaleimide unit.

The resin (A) may contain only one kind of maleimide unit or two or more kinds of maleimide units.

The maleimide unit content of the resin (A) is not particularly limited, and can be appropriately determined in consideration of, for example, the structure of $R^{13}$. However, the maleimide unit content is preferably 1.0 wt % or more, more preferably 1 wt % to 99 wt %, even more preferably 1 wt % to 80 wt % with respect to the total weight of the resin (A). If the maleimide unit content is not within the above range, optical isotropy tends to be poor.

The (meth)acrylic ester unit that the resin (A) has may be the same as a unit represented by a general formula (2) that will be described later with reference to the resin (B). Particularly, from the viewpoint of transparency, the resin (A) preferably contains a methyl methacrylate unit. The (meth)acrylic ester unit content of the resin (A) is not particularly limited, but is preferably 1 to 99 wt %, more preferably 10 to 95 wt %, even more preferably 10 to 90 wt % with respect to the total weight of the resin (A). The resin (A) may contain only one kind of (meth)acrylic ester unit or two or more kinds of (meth)acrylic ester units.

The resin (A) preferably further has a unit represented by the following general formula (3) to adjust optical characteristics:

[Chemical Formula 6]

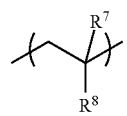

(3)

wherein $R^7$ is hydrogen or an alkyl group having 1 to 8 carbon atoms and $R^8$ is an aryl group having 6 to 10 carbon atoms.

The aromatic vinyl unit represented by the above general formula (3) is not particularly limited, and examples thereof include a styrene unit and an α-methylstyrene unit. The aromatic vinyl unit is preferably a styrene unit.

The resin (A) may contain only one kind of unit represented by the above general formula (3) or may contain two or more kinds of units represented by the above general formula (3) between which one of $R^7$ and $R^8$ is different or both of them are different.

The amount of the unit represented by the general formula (3) contained in the resin (A) is not particularly limited, but is preferably 0 to 40 wt %, more preferably 0 to 20 wt %, particularly preferably 0 to 15 wt % with respect to the total weight of the resin (A).

If necessary, the resin (A) may further contain another unit other than the units described above.

The weight-average molecular weight of the resin (A) is not particularly limited, but is preferably in the range of $1 \times 10^4$ to $5 \times 10^5$. By setting the weight-average molecular weight of the resin (A) to a value within the above range, it is possible to prevent deterioration of molding processability or to prevent a resulting film from having poor mechanical strength when the film is processed. On the other hand, if the weight-average molecular weight is less than the above lower limit, a resulting film tends to have poor mechanical strength. If the weight-average molecular weight exceeds the above upper limit, viscosity during melt extrusion tends to be high, molding processability tends to be deteriorated, and molded article productivity tends to be reduced.

The resin (A) can be obtained by, for example, the following polymerization step. Further, the resin (A) can be refined by the following devolatilization step.

(Polymerization Step)

The resin (A) can be obtained by polymerizing monomers selected from the monomers described above as its structural units.

In a polymerization reaction to obtain the resin (A) according to this embodiment, monomers whose reactivities are close to each other and/or monomers whose copolymerizabilities are high are preferably combined because the compositional ratio of the resulting resin (A) can be easily controlled based on the compositional ratio of raw materials charged into a reaction liquid. On the other hand, if monomers whose reactivities are significantly different are combined, problems may occur such as a problem a) that a monomer having low reactivity does not sufficiently react and remains as an unreacted monomer and a problem b) that the compositional ratio of the resulting resin (A) is difficult to be predicted. Particularly, if the unreacted monomer remains, there is also a problem that the characteristics of the resin (A), such as transparency and light resistance, are deteriorated.

Examples of the polymerization method that can be used to obtain the resin (A) include common polymerization methods such as cast polymerization, bulk polymerization, suspension polymerization, solution polymerization, emulsion polymerization, living radical polymerization, and anion polymerization. In order to use the resin (A) as an optical material, mixing of minute foreign matter into the resin (A) is preferably avoided as much as possible. From such a viewpoint, cast polymerization, solution polymerization, or suspension polymerization is preferably used, and cast polymerization or solution polymerization not using a suspension agent or an emulsifying agent is more preferably used.

A polymerization mode may be, for example, either batch polymerization or continuous polymerization. From the viewpoint of simple polymerization operation, batch polymerization is preferred, and from the viewpoint of obtaining a polymer more uniform in composition, continuous polymerization is preferred.

The temperature and time of the polymerization reaction can be appropriately adjusted depending on the kinds of monomers used or the ratio between monomers used. For example, the polymerization temperature is 0 to 150° C. and the polymerization time is 0.5 to 24 hours, and preferably, the polymerization temperature is 40 to 150° C. and the polymerization time is 1 to 15 hours.

In a radical polymerization reaction, a polymerization initiator may be added, if necessary. As the polymerization initiator, any initiator commonly used in radical polymerization can be used. Examples of such an initiator include: organic peroxides such as cumene hydroperoxide, diisopropylbenzene hydroperoxide, di-t-butyl peroxide, lauroyl peroxide, benzoyl peroxide, t-butyl peroxy isopropyl carbonate, t-amyl peroxy-2-ethyl hexanoate, and lauroyl peroxide; and azo compounds such as 2,2'-azobis(isobutyronitrile), 1,1'-azobis(cyclohexanecarbonitrile), 2,2'-azobis(2,4-dimethylvaleronitrile), and dimethyl-2,2'-azobisisobutyrate. These polymerization initiators may be used singly or in combination of two or more of them.

The amount of the polymerization initiator to be used is not particularly limited and may be appropriately set depending on the combination of monomers or reaction conditions, but is preferably in the range of 0.005 to 5 mass %.

A molecular weight modifier used in the polymerization reaction, if necessary, is any molecular weight modifier commonly used in radical polymerization. Particularly preferred examples of such a molecular weight modifier include mercaptan compounds such as butyl mercaptan, octyl mercaptan, dodecyl mercaptan, and 2-ethylhexyl thioglycolate. Such a molecular weight modifier is added at a concentration within such a range that the molecular weight is controlled to be within the above range.

When a solvent is used in the polymerization reaction, examples of the polymerization solvent include: aromatic hydrocarbon-based solvents such as toluene, xylene, and ethyl benzene; ketone-based solvents such as methyl ethyl ketone and methyl isobutyl ketone; and ether-based solvents such as tetrahydrofuran. These solvents may be used singly or in combination of two or more of them. If the boiling point of the solvent used is too high, the finally-obtained resin (A) has a high residual volatile matter content. For this reason, a solvent having a boiling point of 50 to 200° C. is preferred.

In the polymerization reaction, an organic phosphorus compound or an organic acid may be added, if necessary. When these compounds coexist, there may be a case where a side reaction is suppressed and/or the amount of unreacted N-substituted maleimide is reduced so that coloring of the resulting resin (A) during molding processing is reduced.

Examples of the organic phosphorus compound include: alkyl(aryl) phosphonous acid and diesters or monoesters thereof; dialkyl(aryl) phosphine acid and esters thereof; alkyl(aryl) phosphonic acid and diesters or monoesters thereof; alkyl phosphonous acid and esters thereof; phosphorous acid diesters, phosphorous acid monoesters, and phosphorous acid triesters; phosphoric diesters, phosphoric monoesters, and phosphoric triesters. These organic phosphorus compounds may be used singly or in combination of two or more of them. The amount of the organic phosphorus compound to be used is preferably 0.001 to 5.0 mass % with respect to the total mass of monomers.

Examples of the organic acid include acetic acid, propionic acid, butyric acid, valeric acid, caproic acid, caprylic acid, capric acid, lauric acid, stearic acid, oleic acid, linoleic acid, linolenic acid, benzoic acid, cyclohexanecarboxylic acid, phthalic acid, isophthalic acid, and terephthalic acid, and acid anhydrides thereof. These organic acids may be used singly or in combination of two or more of them. The amount of the organic acid to be used is preferably 0.001 to 1.0 mass % with respect to the total mass of monomers.

The polymerization reaction is preferably performed at a polymer concentration of 10 to 95 mass %, more preferably 75 mass % or less, even more preferably 60 mass % or less to achieve an appropriate viscosity of a reaction liquid from the viewpoint of removing heat during polymerization. When the polymer concentration is 10 mass % or more, the adjustment of molecular weight and molecular weight distribution is easily performed. When the polymer concentration is 95 mass % or less, a polymer having a high molecular weight can be obtained.

From the viewpoint of maintaining an appropriate viscosity of the obtained polymerization reaction liquid, a polymerization solvent can be appropriately added. By maintaining an appropriate viscosity of the reaction liquid, heat removal can be controlled and the generation of microgels in the reaction liquid can be suppressed. Particularly, in the latter half of the polymerization reaction in which the viscosity increases, it is more preferred that the polymer concentration is controlled to be 50 mass % or less by appropriately adding the polymerization solvent.

The mode of appropriately adding the polymerization solvent to the polymerization reaction liquid is not particularly limited. For example, the polymerization solvent may be added continuously or intermittently. By controlling the concentration of the resin (A) formed in the polymerization reaction liquid in this way, the uniformity of temperature in the reactor can be improved and gelation of the reaction liquid can be more sufficiently suppressed. The polymerization solvent to be added may be, for example, the same as or different from a solvent initially charged to perform the polymerization reaction. However, a solvent that is the same as a solvent initially charged to perform the polymerization reaction is preferably used. The polymerization solvent to be added may be a single solvent of only one kind of solvent or a mixed solvent of two or more kinds of solvents.

When the resin (A) is obtained by suspension polymerization, a suspension agent and, if necessary, an auxiliary suspension agent are added to an aqueous medium. Examples of the suspension agent include: water-soluble polymers such as polyvinyl alcohol, methyl cellulose, polyoxyethylene-polyoxypropylene block copolymer, polyethylene oxide, and polyacrylamide; and inorganic substances such as calcium phosphate and magnesium pyrophosphate. The amount of the water-soluble polymer to be used is preferably 0.01 to 2 mass % with respect to the total mass of monomers, and the amount of the inorganic substance to be used is preferably 0.01 to 2 mass % with respect to the total mass of monomers. Examples of the auxiliary suspension agent include: low-molecular weight surfactants such as anionic surfactants such as sodium dodecylbenzene sulfonate, sodium lauryl sulfate, sodium alkyl naphthalene sulfonate, and sodium dialkylsulfosuccinate; and water-soluble inorganic salts such as boric acid, sodium carbonate, disodium hydrogen phosphate, sodium dihydrogen phosphate, and sodium sulfate. The auxiliary suspension agent is preferably disodium hydrogen phosphate or sodium dodecylbenzenesulfonate. When an inorganic substance is used as the suspension agent, the auxiliary suspension agent is preferably used. The auxiliary suspension agent is preferably used in an amount of 0.001 to 2 mass % per 100 mass % of monomers.

(Devolatilization Step)

The devolatilization step means a step in which volatile components such as a polymerization solvent, residual monomers, and water are removed by the application of heat under reduced pressure, if necessary. If such removal treatment is insufficient, the resulting resin (A) has a high residual volatile matter content, and therefore the resin (A) may be colored due to alteration or the like during molding, or molding defects such as bubbles or silver streaks may occur. The residual volatile matter content is 1 mass % or less, preferably 0.5 mass % or less, more preferably 0.4 mass % or less, even more preferably 0.3 mass % or less per 100 mass % of the resin (A). The residual volatile matter content corresponds to the total amount of residual monomers that have not been reacted in the above-described polymerization reaction, a polymerization solvent, and a side-reaction product.

Examples of an apparatus used in the devolatilization step include a devolatilization apparatus including a heat exchanger and a devolatilization tank; a vent-equipped extruder; and an apparatus in which a devolatilizer and an extruder are arranged in series. When a vent-equipped extruder is used, the extruder may have one vent or two or more vents, but preferably has two or more vents.

The temperature of the devolatilization step is preferably 150 to 350° C., more preferably 170 to 330° C., even more preferably 200 to 300° C. If the temperature is less than 150° C., there is a case where the resin (A) has a high residual volatile matter content. On the other hand, if the temperature exceeds 350° C., there is a case where the resulting resin (A) is colored or decomposed.

The pressure of the devolatilization step is preferably 931 to 1.33 hPa (700 to 1 mmHg), more preferably 800 to 13.3 hPa (600 to 10 mmHg), even more preferably 667 to 20.0 hPa (500 to 15 mmHg). If the pressure exceeds 931 hPa (700 mmHg), there is a case where volatile matter is likely to remain. On the other hand, if the pressure is less than 1.33 hPa (1 mmHg), there is a case where devolatilization is difficult to be industrially performed.

The treatment time is appropriately selected depending on the amount of residual volatile matter, but is preferably as short as possible in order to suppress the coloring or decomposition of the resulting resin (A).

In a case where the reaction conversion rate of monomers in the polymerization reaction is low, a large amount of unreacted monomers remains in the polymerization solution. In this case, treatment needs to be performed for a long time at a high treatment temperature to reduce the residual volatile matter content of the resulting resin (A). However, this causes a problem that coloring or decomposition is likely to occur. In a case where the polymerization reaction liquid containing a large amount of unreacted monomers is treated, the monomers that cause a problem can be removed from the polymerization reaction liquid by, for example, performing pretreatment in which an aromatic hydrocarbon-based solvent, a hydrocarbon-based solvent, an alcohol-based solvent or the like is added to the polymerization solution, homogenizer (emulsion and dispersion) treatment is then performed, and liquid-liquid extraction or solid-liquid extraction of the unreacted monomers is performed. When the polymerization reaction liquid after separation of the monomers by the pretreatment is subjected to the devolatilization step, the total amount of monomers remaining in 100 mass % of a resulting thermoplastic resin can be reduced to 1 mass % or less.

(Glutarimide Acrylic Resin (B))

The glutarimide acrylic resin (B) is an acrylic resin having a glutarimide structure, and generally has a glass transition temperature of 120° C. or higher. A specific example of the glutarimide acrylic resin includes a resin having a unit represented by the following general formula (1) and a unit represented by the following general formula (2):

[Chemical Formula 7]

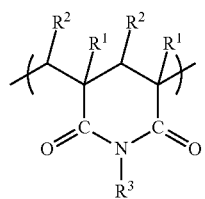

(1)

wherein $R^1$ and $R^2$ are each independently hydrogen or an alkyl group having 1 to 8 carbon atoms and $R^3$ is hydrogen, an alkyl group having 1 to 18 carbon atoms, a cycloalkyl group having 3 to 12 carbon atoms, or an aromatic ring-containing substituent group having 5 to 15 carbon atoms. Hereinafter, the unit represented by the above general formula (1) is also referred to as "glutarimide unit".

In the above general formula (1), $R^1$ and $R^2$ are preferably each independently hydrogen or a methyl group and $R^3$ is preferably hydrogen, a methyl group, a butyl group, or a cyclohexyl group, and $R^1$, $R^2$, and $R^3$ are more preferably a methyl group, hydrogen, and a methyl group, respectively.

The glutarimide acrylic resin (B) may contain only one kind of glutarimide unit or two or more kinds of glutarimide units between which any one of $R^1$, $R^2$, and $R^3$ in the above general formula (1) is different or all of them are different.

The glutarimide unit can be formed by imidizing a (meth)acrylic ester unit represented by the following general formula (2). Alternatively, the glutarimide unit may be formed by imidizing an acid anhydride such as maleic anhydride, a half ester obtained from the acid anhydride and a linear or branched alcohol having 1 to 20 carbon atoms, or α,β-ethylenic unsaturated carboxylic acid (e.g., acrylic acid, methacrylic acid, maleic acid, itaconic acid, crotonic acid, fumaric acid, citraconic acid).

The glutarimide unit content of the glutarimide acrylic resin (B) is not particularly limited, and can be appropriately determined in consideration of, for example, the structure of $R^3$. However, the glutarimide unit content is preferably 1.0 wt % or more, more preferably 3.0 wt % to 90 wt %, even more preferably 5.0 wt % to 60 wt % with respect to the total weight of the glutarimide acrylic resin (B). If the glutarimide unit content is less than the above lower limit, a resulting glutarimide acrylic resin (B) tends to be poor in heat resistance or tends to have impaired transparency. On the other hand, if the glutarimide unit content exceeds the above upper limit, heat resistance and melt viscosity become unnecessarily high, which tends to deteriorate molding processability, significantly decrease the mechanical strength of a resulting film when the film is processed, or impair transparency.

The glutarimide unit content is calculated in the following manner.

The resin is subjected to $^1$H-NMR analysis using $^1$H-NMR BRUKER Avance III (400 MHz) to determine the amount (mol %) of each monomer unit, such as a glutarimide unit or an ester unit, contained in the resin, and then the monomer unit content (mol %) is converted to a monomer unit content (wt %) using the molecular weight of each monomer unit.

For example, when the resin is composed of a glutarimide unit whose $R^3$ in the above general formula (1) is a methyl group and a methyl methacrylate unit, a glutarimide unit content (wt %) can be determined from the following calculation formula using the area a of a peak derived from protons of O—CH$_3$ of methyl methacrylate and appearing at about 3.5 to 3.8 ppm and the area b of a peak derived from protons of N—CH$_3$ of glutarimide and appearing at about 3.0 to 3.3 ppm.

[Methyl methacrylate unit content $A$ (mol %)]=100×
 $a/(a+b)$

[Glutarimide unit content $B$ (mol %)]=100×$b/(a+b)$

[Glutarimide unit content (wt %)]=100×($b$×(molecular weight of glutarimide unit)/($a$×(molecular weight of methyl methacrylate unit)+$b$×(molecular weight of glutarimide unit))

It is to be noted that even when the resin contains a monomer unit other than the above units, the glutarimide unit content (wt %) can be determined in the same manner as described above from the amount (mol %) of each monomer unit contained in the resin and the molecular weight of each monomer unit.

When the optical resin composition according to the present invention is used for, for example, a polarizer protective film, the glutarimide unit content is preferably 20 wt % or less, more preferably 15 wt % or less, even more preferably 10 wt % or less because birefringence is more likely to be suppressed.

[Chemical Formula 8]

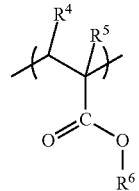

(2)

wherein $R^4$ and $R^5$ are each independently hydrogen or an alkyl group having 1 to 8 carbon atoms and $R^6$ is an alkyl group having 1 to 18 carbon atoms, a cycloalkyl group having 3 to 12 carbon atoms, or an aromatic ring-containing substituent group having 5 to 15 carbon atoms. Hereinafter, the unit represented by the above general formula (2) is also referred to as "(meth)acrylic ester unit". It is to be noted that in this specification, "(meth)acrylic" refers to "methacrylic or acrylic".

In the above general formula (2), $R^4$ and $R^5$ are preferably each independently hydrogen or a methyl group and $R^6$ is preferably hydrogen or a methyl group, and $R^4$, $R^5$, and $R^6$ are more preferably hydrogen, a methyl group, and a methyl group, respectively.

The glutarimide acrylic resin (B) may contain only one kind of (meth)acrylic ester unit or two or more kinds of (meth)acrylic ester units between which any one of $R^4$, $R^5$, and $R^6$ in the above general formula (2) is different or all of them are different.

If necessary, the glutarimide acrylic resin (B) may further contain a unit represented by the following general formula (3) (hereinafter, also referred to as "aromatic vinyl unit"):

[Chemical Formula 9]

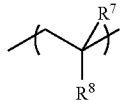

(3)

wherein $R^7$ is hydrogen or an alkyl group having 1 to 8 carbon atoms and $R^8$ is an aryl group having 6 to 10 carbon atoms.

The aromatic vinyl unit represented by the above general formula (3) is not particularly limited, and examples thereof include a styrene unit and an α-methylstyrene unit. The aromatic vinyl unit is preferably a styrene unit.

The glutarimide acrylic resin (B) may contain only one kind of aromatic vinyl unit or two or more kinds of aromatic vinyl units between which one of $R^7$ and $R^8$ is different or both of them are different.

The aromatic vinyl unit content of the glutarimide acrylic resin (B) is not particularly limited, but is preferably 0 to 50 wt %, more preferably 0 to 20 wt %, particularly preferably 0 to 15 wt % with respect to the total weight of the glutarimide acrylic resin (B). If the aromatic vinyl unit content exceeds the above upper limit, the glutarimide acrylic resin (B) cannot have sufficient heat resistance.

However, in the present invention, the glutarimide acrylic resin (B) preferably contains no aromatic vinyl unit from the viewpoint of improving bending resistance and transparency, reducing fish-eyes, and improving solvent resistance or weather resistance.

If necessary, the glutarimide acrylic resin (B) may further contain another unit other than the glutarimide unit, the (meth)acrylic ester unit, and the aromatic vinyl unit.

Examples of the another unit include amide-based units such as acrylamide and methacrylamide, a glutaric anhydride unit, and nitrile-based units such as acrylonitrile and methacrylonitrile.

The another unit may be incorporated into the glutarimide acrylic resin (B) by random copolymerization or graft copolymerization.

The another unit may be incorporated by copolymerization of a monomer constituting the another unit with the glutarimide acrylic resin (B) and/or a resin as a raw material for producing the resin (B). Alternatively, the another unit incorporated into the resin (B) may be a by-product of the above-described imidization reaction.

The weight-average molecular weight of the glutarimide acrylic resin (B) is not particularly limited, but is preferably in the range of $1 \times 10^4$ to $5 \times 10^5$. By setting the weight-average molecular weight of the glutarimide acrylic resin (B) to a value within the above range, it is possible to prevent deterioration of molding processability or to prevent a resulting film from having poor mechanical strength when the film is processed. On the other hand, if the weight-average molecular weight is less than the above lower limit, a resulting film tends to have poor mechanical strength. If the weight-average molecular weight exceeds the above upper limit, viscosity during melt extrusion tends to be high, molding processability tends to be deteriorated, and molded article productivity tends to be reduced.

The glass transition temperature of the glutarimide acrylic resin (B) is preferably 120° C. or higher so that a resulting film can have excellent heat resistance. More preferably, the glass transition temperature of the glutarimide acrylic resin (B) is 125° C. or higher. If the glass transition temperature of the glutarimide acrylic resin (B) is lower than the above lower limit, a resulting film cannot have sufficient heat resistance.

Hereinbelow, one example of a method for producing the glutarimide acrylic resin (B) will be described.

First, a (meth)acrylic ester polymer is produced by polymerization of (meth)acrylic ester. When the glutarimide acrylic resin (B) contains an aromatic vinyl unit, a (meth)acrylic ester-aromatic vinyl copolymer is produced by copolymerization of (meth)acrylic ester and an aromatic vinyl compound.

The (meth)acrylic ester used in this step is preferably, for example, methyl (meth)acrylate, ethyl (meth)acrylate, butyl (meth)acrylate, isobutyl (meth)acrylate, t-butyl (meth)acrylate, benzyl (meth)acrylate, or cyclohexyl (meth)acrylate, and is more preferably methyl methacrylate.

These (meth)acrylic esters may be used singly or in combination of two or more of them. The use of two or more kinds of (meth)acrylic esters makes it possible to finally obtain a glutarimide acrylic resin (B) containing two or more kinds of (meth)acrylic ester units.

The structure of the (meth)acrylic ester polymer or the (meth)acrylic ester-aromatic vinyl copolymer is not particularly limited as long as a subsequent imidization reaction can be performed. More specifically, the (meth)acrylic ester polymer or the (meth)acrylic ester-aromatic vinyl copolymer may be a linear polymer, a block polymer, a branched polymer, a ladder polymer, or a cross-linked polymer.

In the case of a block polymer, the block polymer may be any one of an A-B-type block polymer, an A-B-C-type block polymer, an A-B-A-type block polymer, or another type of block polymer.

The (meth)acrylic ester polymer or the (meth)acrylic ester-aromatic vinyl copolymer is reacted with an imidization agent to perform an imidization reaction. In this way, the glutarimide acrylic resin (B) can be produced.

The imidization agent is not particularly limited as long as the glutarimide unit represented by the above general formula (1) can be produced. More specifically, ammonia or a primary amine can be used. Examples of the primary amine include: aliphatic hydrocarbon group-containing primary amines such as methylamine, ethylamine, n-propylamine, i-propylamine, n-butylamine, i-butylamine, tert-butylamine, and n-hexylamine; aromatic hydrocarbon group-containing primary amines such as aniline, benzylamine, toluidine, and trichloroaniline; and alicyclic hydrocarbon group-containing primary amines such as cyclohexylamine.

The imidization agent may be a urea-based compound that generates ammonia or a primary amine by heating, and examples of such a compound include urea, 1,3-dimethyl urea, 1,3-diethyl urea, and 1,3-dipropyl urea.

Among these imidization agents, ammonia, methylamine, and cyclohexylamine are preferably used, and methylamine is particularly preferably used from the viewpoint of cost and physical properties.

In this imidization step, a ring-closing promoter may be added in addition to the imidization agent, if necessary.

In this imidization step, the glutarimide unit content of a resulting glutarimide acrylic resin (B) can be adjusted by adjusting the ratio of the imidization agent added.

A method for performing the imidization reaction is not particularly limited, and a conventionally-known method can be used. For example, the imidization reaction is allowed to proceed by using an extruder or a batch-type reactor (pressure vessel).

The extruder is not particularly limited, and various extruders such as a single-screw extruder, a twin-screw extruder, and a multi-screw extruder can be used.

Among them, a twin-screw extruder is preferably used. The use of a twin-screw extruder makes it possible to promote mixing of the raw material polymer and the imidization agent (when a ring-closing promoter is used, mixing of the imidization agent and the ring-closing agent).

Examples of the twin-screw extruder include a non-intermeshing co-rotating twin-screw extruder, an intermeshing co-rotating twin-screw extruder, a non-intermeshing counter-rotating twin-screw extruder, and an intermeshing counter-rotating twin-screw extruder. Among them, an intermeshing co-rotating twin-screw extruder is preferred. The screws of an intermeshing co-rotating twin-screw extruder can rotate at high speed, and therefore mixing of the raw material polymer and the imidization agent (when a ring-closing promoter is used, mixing of the imidization agent and the ring-closing promoter) can be further promoted.

The above-mentioned extruders may be used singly or in combination of two or more of them serially connected.

The glutarimide acrylic resin (B) production method may include, in addition to the above-described imidization step, an esterification step in which treatment using an esterification agent is performed. The esterification step makes it possible to convert carboxyl groups contained in the resin as a by-product of the imidization step to ester groups. This makes it possible to adjust the acid value of the glutarimide acrylic resin (B) to a value within a desired range.

The acid value of the glutarimide acrylic resin (B) is not particularly limited, but is preferably 0.50 mmol/g or less, more preferably 0.45 mmol/g or less. The lower limit of the acid value is not particularly limited, but is preferably 0 mmol/g or more, more preferably 0.05 mmol/g or more, particularly preferably 0.10 mmol/g or more. By setting the acid value to a value within the above range, the glutarimide acrylic resin (B) can offer an excellent balance of heat resistance, mechanical properties, and molding processability. On the other hand, if the acid value exceeds the above upper limit, foaming of the resin is likely to occur during melt extrusion for film formation, which tends to deteriorate molding processability and to reduce molded article productivity. It is to be noted that the acid value can be calculated by, for example, a titration method described in JP-A-2005-23272.

The esterification agent is not particularly limited, and examples thereof include dimethyl carbonate, 2,2-dimethoxypropane, dimethylsulfoxide, triethyl orthoformate, trimethyl orthoacetate, trimethyl orthoformate, diphenyl carbonate, dimethyl sulfate, methyl toluene sulfonate, methyl trifluoromethyl sulfonate, methyl acetate, methanol, ethanol, methyl isocyanate, p-chlorophenyl isocyanate, dimethylcarbodiimide, dimethyl-t-butylsilylchloride, isopropenyl acetate, dimethyl urea, tetramethylammonium hydroxide, dimethyldiethoxysilane, tetra-N-butoxysilane, dimethyl (trimethylsilane) phosphite, trimethyl phosphite, trimethyl phosphate, tricresyl phosphate, diazomethane, ethylene oxide, propylene oxide, cyclohexene oxide, 2-ethylhexyl glycidyl ether, phenyl glycidyl ether, and benzyl glycidyl ether. Among them, dimethyl carbonate and trimethyl orthoacetate are preferred from the viewpoint of cost and reactivity, and dimethyl carbonate is particularly preferred from the viewpoint of cost.

The amount of the esterification agent to be used is not particularly limited, but is preferably 0 to 12 parts by weight, more preferably 0 to 8 parts by weight per 100 parts by weight of the (meth)acrylic ester polymer or the (meth) acrylic ester-aromatic vinyl copolymer. By setting the amount of the esterification agent to be used to a value within the above range, it is possible to adjust the acid value of the glutarimide acrylic resin (B) to a value within an appropriate range. On the other hand, if the amount of the esterification agent to be used is not within the above range, there is a possibility that part of the esterification agent will remain unreacted in the resin, which may cause foaming or odor generation when molding is performed using the resin.

A catalyst may also be used in combination with the esterification agent. The type of catalyst to be used is not particularly limited, and examples of the catalyst include aliphatic tertiary amines such as trimethylamine, triethylamine, and tributylamine. Among them, triethylamine is preferred from the viewpoint of cost, reactivity, etc.

As in the case of the imidization step, the esterification step is allowed to proceed using, for example, an extruder or a batch-type reactor.

This esterification step may be performed only by heat treatment without using the esterification agent. The heat treatment can be achieved by kneading and dispersing the melted resin in an extruder. When only the heat treatment is performed as the esterification step, some or all of carboxyl groups contained in the resin as a by-product of the imidization step can be turned into acid anhydride groups by, for example, a dehydration reaction between carboxyl groups in the resin and/or a dealcoholization reaction between a carboxyl group in the resin and an alkyl ester group in the resin. At this time, a ring-closing promoter (catalyst) may also be used.

Even when the esterification step is performed using the esterification agent, conversion to acid anhydride groups by heat treatment can be allowed to proceed in parallel.

In both the imidization step and the esterification step, an extruder used is preferably equipped with a vent port so that the pressure in the extruder can be reduced to atmospheric pressure or less. The use of such a machine makes it possible to remove unreacted part of the imidization agent, unreacted part of the esterification agent, a by-product such as methanol, or monomers.

The glutarimide acrylic resin (B) can also be appropriately produced using, instead of an extruder, a high-viscosity reaction apparatus such as a horizontal twin screw reaction apparatus, such as BIVOLAK manufactured by Sumitomo Heavy Industries, Ltd., or a vertical twin screw mixing vessel such as SUPER BLEND.

When the glutarimide acrylic resin (B) is produced using a batch-type reactor (pressure vessel), the structure of the batch-type reactor (pressure vessel) is not particularly limited. More specifically, the batch-type reactor shall have a structure in which the raw material polymer can be melted by heating and stirred and the imidization agent (when a ring-closing promoter is used, the imidization agent and the ring-closing promoter) can be added, but preferably has a structure excellent in stirring efficiency. The use of such a batch-type reactor makes it possible to prevent insufficient stirring due to an increase in polymer viscosity with the progress of reaction. Examples of a batch-type reactor having such a structure include a mixing vessel MAX BLEND manufactured by Sumitomo Heavy Industries, Ltd. and the like.

In such a way as described above, the glutarimide acrylic resin (B) whose glutarimide unit content is controlled to be a specific value can be easily produced.

The amount of the resin (A) can be appropriately determined depending on desired physical properties of the optical resin composition, and is preferably, for example, 1 to 99 parts by weight per 100 parts by weight of the total amount of the resin (A) and the resin (B). The amount of the resin (A) is more preferably 1 to 80 parts by weight, even more preferably 5 to 70 parts by weight.

The resin (A) and the glutarimide acrylic resin (B) are highly miscible, and therefore a mixture of them also has high transparency. More specifically, when a molded body (thickness: 125 μm) made of the resin (A) and the glutarimide acrylic resin (B) is prepared, the haze of the molded body is preferably 2.0% or less, more preferably 1.0% or less, even more preferably 0.8% or less, particularly preferably 0.5% or less.

A mixed resin of the resin (A) and the glutarimide acrylic resin (B) can have a small photoelastic constant. The photoelastic constant of the mixed resin of the resin (A) and the glutarimide acrylic resin (B) is preferably $-10 \times 10^{-12}$ to $+10 \times 10^{-12}$ $Pa^{-1}$, more preferably $-7 \times 10^{-12}$ to $+7 \times 10^{-12}$ $Pa^{-1}$, even more preferably $-5 \times 10^{-12}$ to $+5 \times 10^{-12}$ $Pa^{-1}$, even more preferably $-3 \times 10^{-12}$ to $+3 \times 10^{-12}$ $Pa^{-1}$, particularly preferably $-1 \times 10^{-12}$ to $+1 \times 10^{-12}$ $Pa^{-1}$. When the photoelastic constant of the resin (A) and the photoelastic constant of the glutarimide acrylic resin (B) are opposite in sign, the photoelastic constant of the mixed resin can further be reduced.

The mixed resin of the resin (A) and the glutarimide acrylic resin (B) can have low orientation birefringence, and the orientation birefringence of the mixed resin is preferably $-15 \times 10^{-4}$ to $+15 \times 10^{-4}$, more preferably $-10 \times 10^{-4}$ to $+10 \times 10^{-4}$, even more preferably $-5 \times 10^{-4}$ to $+5 \times 10^{-4}$, even more preferably $-3 \times 10^{-4}$ to $+3 \times 10^{-4}$, particularly preferably $-2.6 \times 10^{-4}$ to $+2.6 \times 10^{-4}$. When the orientation birefringence of the resin (A) and the orientation birefringence of the glutarimide acrylic resin (B) are opposite in sign, the orientation birefringence of the mixed resin can further be reduced.

(Multi-Layered Particles (E))

The optical resin composition according to the present invention contains the resin (A) and the resin (B) as a matrix resin, and may further contain multi-layered particles (E). (Hereinafter, the matrix resin refers to the resin (A) and the resin (B)). Addition of the multi-layered particles makes it possible to improve the mechanical strength of a resulting film such as bending resistance and trimming property. The multi-layered particles are preferably acrylic rubber particles from the viewpoint of miscibility with the matrix resin.

The multi-layered particles (E) used in the present invention are made of a polymer having a weight-average molecular weight of preferably exceeding 5000, more preferably 10000 or more, even more preferably 20000 or more. If the weight-average molecular weight is 5000 or less, there is a fear that the physical properties, such as mechanical properties, heat resistance, and hardness, of a resulting molded body are deteriorated or the appearance of a resulting molded body is impaired due to bleeding out on the surface of the molded body during high-temperature molding processing.

The multi-layered particles preferably have a cross-linked structure in part thereof from the viewpoint of improving mechanical strength and the viewpoint of optical isotropy, and may be made of, for example, a multi-layered polymer having a cross-linked polymer layer. The multi-layered particles preferably have a hard polymer part from the viewpoint of heat resistance, and preferably have a non-crosslinked structure from the viewpoint of reducing birefringence, and particularly preferably have a hard polymer part having a non-crosslinked structure. For example, the multi-layered particles may be made of a multi-layered polymer having a hard polymer layer. The multi-layered particles are more preferably made of a multi-layered polymer containing a cross-linked polymer layer and a hard polymer layer. In general, a multi-layered polymer is also referred to as a graft copolymer or a core-shell polymer, and the multi-layered polymer constituting the multi-layered particles used in the present invention includes these polymers.

There is a case where a molded body, especially an optical film, made of the optical resin composition according to the present invention needs to have high heat resistance and mechanical strength. Particularly, when used as an optical film for liquid crystal displays, the molded body needs to have high heat resistance, because it is exposed to high temperature when subjected to a film coating process or the like during production as well as when practically used. Further, the molded body needs to have also mechanical strength such as trimming property or crack resistance, because a punching process or the like is performed after film coating or bonding to another member as well as during film production. In this case, addition of the multi-layered particles (E) whose cross-linked polymer layer is "soft" to the matrix resin makes it possible to significantly improve mechanical strength and achieve high heat resistance at the same time. In order to obtain such an effect, the multi-layered particles (E) are preferably made of a graft copolymer (core-shell polymer) having a soft cross-linked polymer layer and a hard polymer layer. Usually, addition of a soft polymer is performed as one of the ways to improve mechanical strength, but in this case, the matrix resin and the soft polymer are uniformly mixed, which is disadvantageous in that a resulting molded body has low heat resistance. On the other hand, when the multi-layered particles are made of a graft copolymer (core-shell polymer) having a soft cross-linked polymer layer and a hard polymer layer, a resulting molded body has a discontinuous sea-island structure in which the soft cross-linked polymer layer is "island" and the matrix resin and the hard polymer layer are "sea", and therefore it is possible to obtain an excellent effect that mechanical strength is improved and heat resistance is hardly reduced. Usually, a soft cross-linked polymer is different in composition from the matrix resin, and therefore it is difficult to uniformly disperse the soft cross-linked polymer in the matrix resin, which deteriorates optical characteristics such as transparency or causes defects such as fish-eyes. However, as described above, when the multi-layered particles are made of a graft copolymer having both a soft cross-linked polymer layer and a hard polymer layer, it is possible to uniformly disperse the soft cross-linked polymer in the matrix resin.

The term "soft" used herein means that the glass transition temperature of the polymer is lower than 20° C. From the viewpoint of enhancing the impact absorption capacity of the soft layer and enhancing an impact resistance improving effect such as crack resistance, the glass transition temperature of the polymer is preferably lower than 0° C., more preferably lower than –20° C.

Further, the term "hard" used herein means that the glass transition temperature of the polymer is 20° C. or higher. If the glass transition temperature of the polymer is lower than 20° C., the optical resin composition containing the multi-layered particles (E) and a film made of the optical resin composition have low heat resistance or there is a problem that coarsening or agglomeration of the multi-layered particles (E) is likely to occur during production of the multi-layered particles (E).

In this specification, the glass transition temperature of the "soft" or "hard" polymer is calculated by Fox equation using a value described in Polymer Hand Book (J. Brandrup, Interscience 1989) (for example, the glass transition temperature of polymethyl methacrylate is 105° C. and the glass transition temperature of polybutyl acrylate is −54° C.).

When a molded body and a film that are made of the optical resin composition according to the present invention do not need to have very high mechanical strength, the cross-linked polymer layer may be either "soft" or "hard", and the definition of "soft" or "hard" is the same as that described above.

In this specification, a graft ratio is used as a parameter to express the degree of covalent bonding of the hard polymer layer to the cross-linked polymer layer in the polymer multi-layered particles (E).

The graft ratio of the multi-layered particles (E) is an index representing the weight ratio of the grafted hard polymer layer to the cross-linked polymer layer when the weight of the cross-linked polymer layer is regarded as 100. The graft ratio is preferably 10 to 250%, more preferably 40 to 230%, most prefer ably 60 to 220%. If the graft ratio is less than 10%, the multi-layered particles (E) are likely to aggregate in a resulting molded body so that there is a fear that transparency is impaired or defects are caused by foreign matter. Further, the tensile elongation at breakage of the film is reduced so that cracking is likely to occur when a resulting film is cut. If the graft ratio is 250% or higher, the melt viscosity of the optical resin composition during molding, for example during film formation, increases, which tends to deteriorate film formability. The calculation formula of the graft ratio will be described later in the section of Examples.

It is to be noted that there is a case where part of the hard polymer layer is not bonded (grafted) to the cross-linked polymer layer (also referred to as free polymer), and this free polymer is also included in the multi-layered particles (E).

(Description of Cross-Linked Polymer Layer)

Hereinbelow, the "soft" cross-linked polymer layer and the "hard" polymer layer will be described with reference to a case where the multi-layered particles (E) are made of a graft copolymer.

1. Description of "Soft" Cross-Linked Polymer Layer

First, the "soft" cross-linked polymer layer will be described. As described above, the term "soft" shall mean that the glass transition temperature of the polymer is less than 20° C., and a rubber-like polymer is preferably used. Specific examples of the rubber-like polymer include butadiene-based cross-linked polymers, (meth)acrylic cross-linked polymers, and organosiloxane-based cross-linked polymers. Among them, (meth)acrylic cross-linked polymers are particularly preferred in terms of the weather resistance (light resistance) and transparency of the optical resin composition and a film made of the optical resin composition.

Hereinbelow, a (meth)acrylic cross-linked polymer layer will be described in detail as a preferred "soft" cross-linked polymer layer.

A (meth)acrylic cross-linked polymer in the (meth)acrylic cross-linked polymer layer is not particularly limited as long as it is a (meth)acrylic cross-linked polymer, but is preferably one obtained by polymerization of 50 to 100 wt % of an acrylic ester, 50 to 0 wt % of another monofunctional monomer copolymerizable with the acrylic ester, and 0.05 to 10 parts by weight of a polyfunctional monomer (per 100 parts by weight of the total amount of the acrylic ester and the another monofunctional monomer copolymerizable therewith) from the viewpoint of impact resistance such as crack resistance. The (meth)acrylic cross-linked polymer layer may be a layer obtained by one-step polymerization performed by mixing all the monomer components or a layer obtained by polymerization performed in two or more steps by changing the composition of monomers.

The acrylic ester used here is preferably alkyl acrylate from the viewpoint of polymerization reactivity and cost. More specifically, the alkyl acrylate is preferably one whose alkyl group has 1 to 12 carbon atoms, and the alkyl group may be either linear or branched. Specific examples of the alkyl acrylate include methyl acrylate, ethyl acrylate, propyl acrylate, n-butyl acrylate, isobutyl acrylate, t-butyl acrylate, 2-ethylhexyl acrylate, benzyl acrylate, n-octyl acrylate, β-hydroxyethyl acrylate, dimethylaminoethyl acrylate, and glycidyl acrylate, and these monomers may be used singly or in combination of two or more of them. The amount of the acrylic ester is preferably 50 to 100 wt %, more preferably 60 to 100 wt %, most preferably 70 to 100 wt % with respect to the total amount of the monofunctional monomers (with respect to the total amount of the acrylic ester and the another monofunctional monomer copolymerizable therewith). If the amount of the acrylic ester is less than 50 wt %, there is a case where the crack resistance of a resulting film is deteriorated.

As an example of the another monofunctional monomer copolymerizable with the acrylic ester (hereinafter, sometimes referred to as "another copolymerizable monofunctional monomer"), methacrylic ester can be mentioned. From the viewpoint of polymerizability and cost, the methacrylic ester is preferably alkyl methacrylate. More specifically, the alkyl methacrylate is preferably one whose alkyl group has 1 to 12 carbon atoms, and the alkyl group may be linear or branched. Specific examples of the alkyl methacrylate include methyl methacrylate, ethyl methacrylate, propyl methacrylate, butyl methacrylate, 2-ethylhexyl methacrylate, benzyl methacrylate, octyl acrylate, β-hydroxyethyl methacrylate, dimethylaminoethyl methacrylate, and glycidyl methacrylate. Other examples of the another copolymerizable monofunctional monomer include: vinyl halides such as vinyl chloride and vinyl bromide; (meth)acrylamides such as acrylamide, methacrylamide, and N-methylolacrylamide; vinyl cyanides such as acrylonitrile and methacrylonitrile; vinyl esters such as vinyl formate, vinyl acetate, and vinyl propionate; aromatic vinyl compounds and derivatives thereof such as styrene, vinyl toluene, and α-methylstyrene; vinylidene halides such as vinylidene chloride and vinylidene fluoride; acrylic acid and salts thereof such as acrylic acid, sodium acrylate, and calcium acrylate; and methacrylic acid and salts thereof such as methacrylic acid, sodium methacrylate, and calcium methacrylate. These monomers may be used in combination of two or more of them.

The above-described monofunctional monomer is copolymerized with the polyfunctional monomer having two or more non-conjugated reactive double bonds per molecule, and as a result, a cross-linked polymer (rubber) is obtained. Examples of the polyfunctional monomer used here include allyl methacrylate, allyl acrylate, triallyl cyanurate, triallyl isocyanurate, diallyl phthalate, diallyl maleate, divinyl adipate, divinylbenzene ethylene glycol dimethacrylate, divinylbenzene ethylene glycol diacrylate, diethylene glycol dimethacrylate, diethylene glycol diacrylate, triethylene glycol dimethacrylate, triethylene glycol diacrylate, trimethylol propane trimethacrylate, trimethylol propane triacrylate, tetramethylol methane tetramethacrylate, tetramethylol methane tetraacrylate, dipropylene glycol dimethacrylate, and dipropylene glycol diacrylate. These polyfunctional monomers may be used in combination of two or more of them.

The amount of the polyfunctional monomer to be added to the monofunctional monomers is preferably 0.05 to 10 parts by weight, more preferably 0.1 to 5 parts by weight per 100 parts by weight of the total amount of the monofunctional monomers. If the amount of the polyfunctional monomer to be added is less than 0.05 part by weight, formation of a cross-linked polymer tends to be impossible. On the other hand, if the amount of the polyfunctional monomer to be added exceeds 10 parts by weight, a resulting film tends to have low crack resistance.

2. Description of "Hard" Polymer Layer

Hereinbelow, the "hard" polymer layer will be described. As described above, the term "hard" means that the polymer has a glass transition temperature of 20° C. or higher.

The hard polymer is not particularly limited as long as its glass transition temperature is 20° C. or higher, and more specifically, the hard polymer can be appropriately formed using the monomer described above with reference to the "soft" cross-linked polymer layer.

Hereinbelow, the polymer composition of the hard polymer will be described in detail.

The composition of the hard polymer is not particularly limited as long as mechanical strength and heat resistance can be improved, and the dispersibility of the multi-layered particles (E) in the resin (i.e., miscibility) can be improved to reduce appearance defects such as fish-eyes. An example of the hard polymer is one obtained by polymerization of a mixture of (meth)acrylic esters and, if necessary, another monofunctional monomer copolymerizable therewith. Examples of the methacrylic ester to be used include methyl methacrylate, ethyl methacrylate, and butyl methacrylate, but methyl methacrylate is most preferred. Examples of the acrylic ester to be used include methyl acrylate, ethyl acrylate, and butyl acrylate. Further, as another copolymerizable vinyl monomer, a known monomer can be used. Examples of such a known monomer include aromatic vinyl monomers such as styrene and vinyl cyanide monomers such as acrylonitrile.

From the viewpoint of cancelling out the photoelastic birefringence or, in some cases, orientation birefringence of the matrix resin, preferred examples of a monomer that is particularly suitable for use in forming the hard polymer include vinyl-based monomers having a ring structure such as an alicyclic structure, a heterocyclic structure, or an aromatic group in their molecular structure (hereinafter, sometimes referred to as "ring structure-containing vinyl-based monomer). Among them, vinyl-based monomers having an alicyclic structure, a heterocyclic structure, or an aromatic group are more preferred. When the monomer is a vinyl-based monomer having an alicyclic structure, the ring structure is preferably a polycyclic structure, more preferably a condensed-ring structure. Examples of the monomer having an alicyclic structure include dicyclopentanyl (meth) acrylate and dicyclopentenyloxyethyl (meth)acrylate. Examples of the monomer having an aromatic group include vinyl arenes such as styrene, α-methylstyrene, monochlorostyrene, and dichlorostyrene, benzyl (meth)acrylate, phenyl (meth)acrylate, and phenoxyethyl (meth)acrylate. Examples of the monomer having a heterocyclic structure include pentamethylpiperidinyl (meth)acrylate, tetramethylpiperidinyl (meth)acrylate, and tetrahydrofurfuryl (meth) acrylate. Particularly, a monomer represented by the following formula (4) is preferably contained as a structural unit.

[Chemical Formula 10]

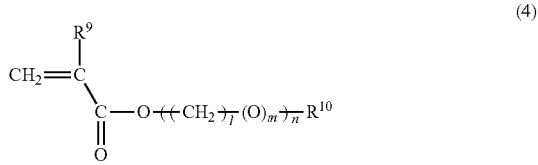

(4)

$R^9$ in the formula (4) is a hydrogen atom or a substituted or unsubstituted linear or branched alkyl group having 1 to 12 carbon atoms, $R^{10}$ is a substituted or unsubstituted aromatic group having 1 to 24 carbon atoms or a substituted or unsubstituted alicyclic group having 1 to 24 carbon atoms and has a homocyclic structure or a heterocyclic structure. A substituent group that $R^9$ and $R^{10}$ may have is, for example, at least one selected from the group consisting of a halogen, a hydroxyl group, a carboxyl group, an alkoxy group, a carbonyl group (ketone structure), an amino group, an amide group, an epoxy group, a carbon-carbon double bond, an ester group (derivative of carboxyl group), a mercapto group, a sulfonyl group, a sulfone group, and a nitro group. Particularly, at least one selected from the group consisting of a halogen, a hydroxyl group, a carboxyl group, an alkoxy group, and a nitro group is preferred. In the above formula (4), l is an integer of 1 to 4, preferably an integer of 1 or 2, m is an integer of 0 or 1, n is an integer of 0 to 10, preferably an integer of 0 to 2, more preferably an integer of 0 or 1.

The vinyl-based monomer having an alicyclic structure, a heterocyclic structure, or an aromatic group is preferably a (meth)acrylic monomer having an alicyclic structure, a heterocyclic structure, or an aromatic structure. More specifically, the (meth)acrylic monomer is preferably one represented by the formula (4) wherein $R^9$ is a hydrogen atom or a substituted or unsubstituted alkyl group having one carbon atom. The (meth)acrylic monomer is more preferably one represented by the formula (4) wherein $R^{10}$ is a substituted or unsubstituted aromatic group having 1 to 24 carbon atoms or a substituted or unsubstituted alicyclic group having 1 to 24 carbon atoms and has a homocyclic structure.

The (meth)acrylic monomer is more preferably one represented by the formula (4) wherein l is an integer of 1 or 2 and n is an integer of 0 to 2.

Among (meth)acrylic monomers represented by the formula (4), benzyl (meth)acrylate, dicyclopentanyl (meth) acrylate, and phenoxyethyl (meth)acrylate are preferred.

Among these monomers represented by the formula (4), benzyl (meth)acrylate is most preferred in terms of optical isotropy, miscibility with the matrix resin, and moldability. Further, benzyl methacrylate is more preferred than benzyl acrylate in terms of heat resistance, because the multi-layered particles obtained as a result of copolymerization and the optical resin composition have higher glass transition temperatures. The acrylic resin used as a matrix resin in the present invention has a negative photoelastic constant, and therefore the use of benzyl methacrylate having a relatively large positive photoelastic constant has merits that the amount of benzyl methacrylate to be used can be reduced or the amount of the multi-layered particles (E) to be used can be reduced and that the degree of freedom of design of the optical resin composition can be increased. Although there is a case where high orientation birefringence of a molded body becomes a problem when the molded body is practically used, the orientation birefringence and photoelastic birefringence of benzyl methacrylate are both positive whereas the orientation birefringence and photoelastic birefringence of the acrylic resin are both negative, and therefore the orientation birefringence of the optical resin composition or a resulting film can be reduced while the photoelastic birefringence of the optical resin composition or a resulting film is also reduced.

From the viewpoint of achieving excellent dispersibility of the multi-layered particles (E) to reduce appearance defects such as fish-eyes while maintaining excellent optical isotropy, the hard polymer having, as a structural unit, the ring structure-containing vinyl-based monomer is preferably one obtained by polymerization of 1 to 100 wt % of the ring structure-containing vinyl-based monomer, 99 to 0 wt % of another monofunctional monomer copolymerizable therewith, and 0 to 2.0 parts by weight of a polyfunctional monomer (per 100 parts by weight of the total amount of the ring structure-containing vinyl-based monomer and the another monofunctional monomer copolymerizable therewith). The hard polymer layer may be one obtained by one-step polymerization performed by mixing all the monomers or one obtained by polymerization performed in two or more steps while changing the composition of monomers.

In the present invention, the ring structure-containing vinyl-based monomers may be used singly or in combination of two or more of them.

As an example of the another monofunctional monomer copolymerizable with the ring structure-containing vinyl-based monomer, methacrylic ester can be mentioned. From the viewpoint of polymerizability and cost, the methacrylic ester is preferably alkyl methacrylate. More specifically, the alkyl methacrylate is preferably one whose alkyl group has 1 to 12 carbon atoms, and the alkyl group may be linear or branched. Specific examples of the alkyl methacrylate include methyl methacrylate, ethyl methacrylate, propyl methacrylate, butyl methacrylate, 2-ethylhexyl methacrylate, octyl acrylate, β-hydroxyethyl methacrylate, dimethylaminoethyl methacrylate, and glycidyl methacrylate. Further, acrylic ester may also be preferably used. From the viewpoint of polymerization reactivity and cost, the acrylic ester is preferably alkyl acrylate. More specifically, the alkyl acrylate is preferably one whose alkyl group has 1 to 12 carbon atoms, and the alkyl group may be either linear or branched. Specific examples of the alkyl acrylate include methyl acrylate, ethyl acrylate, propyl acrylate, n-butyl acrylate, isobutyl acrylate, t-butyl acrylate, 2-ethylhexyl acrylate, n-octyl acrylate, β-hydroxyethyl acrylate, dimethylaminoethyl acrylate, and glycidyl acrylate. Examples of the another copolymerizable monofunctional monomer include: unsubstituted and/or substituted maleic anhydrides such as malic anhydride, citraconic anhydride, dimethyl maleic anhydride, dichloromaleic anhydride, bromomaleic anhydride, dibromomaleic anhydride, phenylmaleic anhydride, and diphenylmaleic anhydride; vinyl halides such as vinyl chloride and vinyl bromide; (meth)acrylamides such as acrylamide, methacrylamide, and N-methylolacrylamide; vinyl cyanides such as acrylonitrile and methacrylonitrile; vinyl esters such as vinyl formate, vinyl acetate, and vinyl propionate; aromatic vinyl compounds and derivatives thereof such as styrene, vinyl toluene, and α-methylstyrene; vinylidene halides such as vinylidene chloride and vinylidene fluoride; acrylic acid and salts thereof such as acrylic acid, sodium acrylate, and calcium acrylate; methacrylic acid and salts thereof such as methacrylic acid, sodium methacrylate, and calcium methacrylate; and (hydroxyalkyl)acrylates such as methyl 2-(hydroxymethyl)acrylate, ethyl 2-(hydroxymethyl)acrylate, isopropyl 2-(hydroxymethyl)acrylate, n-butyl 2-(hydroxymethyl)acrylate, and tertiary butyl 2-(hydroxymethyl)acrylate. These monomers may be used singly or in combination of two or more of them. Particularly, methacrylic ester and/or acrylic ester are/is preferably contained, and alkyl methacrylate and/or alkyl acrylate are/is more preferably contained. From the viewpoint of miscibility with the matrix resin, methyl methacrylate is preferably used. From the viewpoint of suppressing zipper depolymerization, methyl acrylate, ethyl acrylate, or n-butyl acrylate is preferably used. For this reason, methacrylic ester and acrylic ester are preferably contained. The amount of the methacrylic ester contained is preferably 0 to 98 wt %, more preferably 0.1 to 98 wt %, even more preferably 1 to 94 wt %, particularly preferably 30 to 90 wt % per 100 wt % of the total amount of the ring structure-containing vinyl-based monomer and the another monofunctional monomer copolymerizable therewith. Further, the amount of the acrylic ester contained is preferably 0 to 98 wt %, more preferably 0.1 to 98 wt %, even more preferably 1 to 50 wt %, particularly preferably 5 to 50 wt % per 100 wt % of the total amount of the ring structure-containing vinyl-based monomer and the another monofunctional monomer copolymerizable therewith.

From the viewpoint of improving heat stability during molding processing, solvent resistance, and dispersibility of the multi-layered particles (E), (meth)acrylic acid and/or a salt thereof are/is preferably used. Examples of the salt of (meth)acrylic acid include sodium (meth)acrylate, calcium (meth)acrylate, magnesium (meth)acrylate, and ammonium (meth)acrylate.

The amount of (meth)acrylic acid and/or a salt thereof to be used is preferably 0 to 30 wt %, more preferably 0.1 to 30 wt %, even more preferably 0.1 to 20 wt %, even more preferably 0.1 to 15 wt %, even more preferably 0.1 to 10 wt %, most preferably 0.1 to 7 wt % per 100 wt % of the total amount of the monofunctional monomers.

The presence of (meth)acrylic acid as a structural unit in the polymer layer formed by polymerization of the monomer mixture makes it possible to form an acid anhydride structure due to cyclization caused by elimination of alkyl alcohol from a carboxyl group in a (meth)acrylic acid structural unit and an alkyl group in a (meth)acrylic acid derivative structural unit adjacent to the (meth)acrylic acid structural unit during molding processing (e.g., during heat treatment such as heat-melt kneading of the resin (A) with the glutarimide acrylic resin (B)). For example, when a methyl (meth)acrylate structural unit is adjacent to a (meth)acrylic acid structural unit, a methanol elimination reaction occurs so that a glutaric anhydride structure can be formed. Further, when a benzyl (meth)acrylate structural unit is adjacent to a (meth)acrylic acid structural unit, a benzyl alcohol elimination reaction occurs so that a glutaric anhydride structure can be formed.

Further, when the polymer layer formed by polymerization of the monomer mixture has (meth)acrylic salt as a structural unit, a free carboxyl group is dissociated from a salt of a carboxyl group in the (meth)acrylic salt structural unit under high temperature conditions during molding processing, and this carboxyl group and an alkyl group in a (meth)acrylic acid derivative structural unit can be cyclized to form an acid anhydride structure.

Further, when the polymer layer formed by polymerization of the monomer mixture has (meth)acrylic acid as a structural unit, there is a case where a carboxyl group in the (meth)acrylic acid structural unit forms a salt in salt solidification treatment that will be described later. Also in this case, an acid anhydride structure can be formed by dissociation of a free carboxyl group from the salt of a carboxyl group under high temperature conditions during molding processing.

The ratio at which (meth)acrylic acid structural units are converted to acid anhydride structures changes depending on heat history such as processing conditions, and all the (meth)acrylic acid structural units do not necessarily have to be converted to acid anhydride structures, and the degree of cyclization may be arbitrarily adjusted depending on desired characteristics.

From the viewpoint of achieving excellent optical isotropy, heat stability, and solvent resistance and improving the dispersibility of the multi-layered particles (E), the multi-layered particles (E) preferably have a hard polymer layer having, as structural units, the ring structure-containing vinyl-based monomer and (meth)acrylic acid and/or a salt thereof.

The amount of the ring structure-containing vinyl-based monomer to be used is preferably 1 to 100 wt %, more preferably 5 to 70 wt %, most preferably 5 to 50 wt % per 100 wt % of the total amount of the monofunctional monomers (total amount of the ring structure-containing vinyl-based monomer and the another monofunctional monomer copolymerizable therewith).

It is to be noted that the hard polymer layer may include a polyfunctional monomer having two or more unconjugated reactive double bonds per molecule. Here, the polyfunctional monomer to be used may be the same as the polyfunctional monomer that can be used for the cross-linked polymer layer. From the viewpoint of optical isotropy and dispersibility, the amount of the polyfunctional monomer to be used for the hard polymer layer is preferably 0 to 2.0 parts by weight, more preferably 0 to 1.0 part by weight, more preferably 0 to 0.5 part by weight, even more preferably 0 to 0.04 part by weight, most preferably 0 part by weight (per 100 parts by weight of the total amount of the monofunctional monomers).

The multi-layered particles (E) preferably have a hard polymer layer having, as a structural unit, the ring structure-containing vinyl-based monomer in its multi-layered structure. When the multi-layered particles (E) have a hard outermost layer, the multi-layered particles (E) more preferably have, as the outermost layer, a hard polymer layer having, as a structural unit(s), the ring structure-containing vinyl-based monomer and/or (meth)acrylic acid and/or a salt thereof. By allowing the multi-layered particles (E) to have a hard outermost layer, it is possible to allow the multi-layered particles (E) to be more miscible with the matrix resin, further reduce orientation birefringence and photoelastic constant, and easily obtain a film having excellent optical isotropy. A soft layer having a (meth)acrylic cross-linked polymer layer ((meth)acrylic rubber) may be adjacent to the inner side of the hard outermost layer.

The multi-layered particles (E) are preferably made of a multi-layered polymer having at least one (meth)acrylic cross-linked polymer layer and at least one hard polymer layer. From the viewpoint of optical characteristics, at least one of the hard polymer layers more preferably has, as a structural unit(s), the ring structure-containing vinyl-based monomer and/or (meth)acrylic acid and/or a salt thereof. A preferred example of the multi-layered particles (E) is particles having a soft inner layer having a (meth)acrylic cross-linked polymer layer and a hard outer layer having a hard polymer layer having, as a structural unit(s), the monomer represented by the formula (4) and/or (meth)acrylic acid and/or a salt thereof. This example is preferred from the viewpoint of productivity. Another preferred example of the multi-layered particles (E) is particles that have a hard inner layer composed of at least one hard polymer layer, a soft intermediate layer having a soft polymer layer composed of a (meth)acrylic cross-linked polymer layer, and a hard outer layer having a hard polymer layer having, as a structural unit(s), the monomer represented by the formula (4) and/or (meth)acrylic acid and/or a salt thereof. This example may further have a soft innermost layer. In the present invention, they may be appropriately used singly or in combination of two or more of them.

In this specification, the terms "soft inner layer", "soft intermediate layer", and "soft layer" (hereinafter, referred to as "soft layer") refer to an inner layer, an intermediate layer, and a layer composed of at least one soft polymer, respectively.

On the other hand, in this specification, the terms "hard outer(most) layer" and "hard inner layer" refer to an outer (most) layer and an inner layer composed of at least one hard polymer, respectively. It is to be noted that the terms "soft" and "hard" here are the same as those described above.

When the multi-layered particles (E) have a hard layer as an innermost layer, for example, when the multi-layered particles (E) have a multi-layered structure composed of a hard inner layer, a soft intermediate layer, and a hard outer layer, the innermost layer is preferably made of, for example, a hard polymer composed of 40 to 100 wt % of methacrylic ester, 0 to 60 wt % of acrylic ester, 0 to 60 wt % of an aromatic vinyl-based monomer, 0 to 10 wt % of a polyfunctional monomer, and 0 to 20 wt % of another monofunctional monomer copolymerizable with the methacrylic ester, the acrylic ester, and the aromatic vinyl-based monomer from the viewpoint of a balance between hardness and crack resistance.

When the multi-layered particles (E) have a multi-layered structure composed of, for example, a soft inner layer having a (meth)acrylic cross-linked polymer layer and a hard outer layer having a polymer layer having, as a structural unit, the monomer represented by the above formula (4), a layer structure is generally formed in which the soft inner layer is completely covered with the outer hard polymer layer. However, depending on, for example, the weight ratio between the soft inner layer and the hard outer layer, there is a case where the amount of the hard polymer is not sufficient for forming such a layer structure. In this case, the layer structure does not always need to be complete, and a structure in which part of the soft inner layer is covered with the hard polymer as an outer part or a structure in which the hard polymer as an outer part is graft-polymerized with part of the soft inner layer may also be appropriately used. It is to be noted that the same applies to other embodiments of the multi-layered particles.

The volume-average particle diameter to the cross-linked polymer layer of the multi-layered particles (E) is preferably 20 to 450 nm, more preferably 20 to 300 nm, even more preferably 20 to 150 nm, most preferably 30 to 80 nm. If the volume-average particle diameter is less than 20 nm, there is a case where crack resistance is deteriorated. On the other hand, if the volume-average particle diameter exceeds 450 nm, there is a case where transparency is deteriorated.

Further, from the viewpoint of resistance to whitening on bending, the volume-average particle diameter is preferably less than 80 nm. Further, from the viewpoint of trimming property, the volume-average particle diameter is preferably 20 to 450 nm, more preferably 50 to 450 nm, even more preferably 60 to 450 nm, even more preferably 100 to 450 nm. It is to be noted that the volume-average particle diameter can be measured by a dynamic scattering method using, for example, MICROTRAC UPA150 (manufactured by NIKKISO CO., LTD.). More specifically, the volume-average particle diameter to the cross-linked polymer layer of the multi-layered particles (E) refers to the volume-average particle diameter of particles formed from the center to the cross-linked polymer layer of the multi-layered particles (E). When the multi-layered particles (E) have two or more cross-linked polymer layers, the volume-average particle diameter to the cross-linked polymer layer of the multi-layered particles (E) refers to a volume-average particle diameter to the cross-linked polymer layer farthest from the center of the multi-layered particles (E).

The cross-linked polymer content of the multi-layered particles (E) is preferably 10 to 90 wt %, more preferably 20 to 80 wt %, even more preferably 30 to 60 wt %, most preferably 35 to 55 wt % when the amount of the multi-layered particles (E) is taken as 100 wt %. If the cross-linked polymer content is less than 10 wt %, there is a case where a resulting optical resin composition has low mechanical strength such as crack resistance. On the other hand, if the cross-linked polymer content exceeds 90 wt %, the dispersibility of the multi-layered particles (E) is impaired and a resulting molded body cannot have a smooth surface, which tends to cause appearance defects such as fish-eyes. Further, the hard polymer content is not sufficient, which tends to increase orientation birefringence or photoelastic constant so that optical isotropy cannot be maintained.

A method for producing the multi-layered particles (E) is not particularly limited, and a known emulsion polymerization method, emulsion-suspension polymerization method, suspension polymerization method, bulk polymerization method, or solution polymerization method can be used. However, the multi-layered particles (E) are particularly preferably produced by an emulsion polymerization method.

The multi-layered particles (E) are preferably obtained by multistep polymerization. For example, a (meth)acrylic rubber-containing graft copolymer obtained by multistep polymerization can be preferably used, which is obtained by performing, as at least one of the steps of the multistep polymerization, polymerization of a mixture containing the ring structure-containing vinyl-based monomer and/or (meth)acrylic acid and/or a salt thereof in the presence of (meth)acrylic rubber-containing polymer particles. Particularly, the monomer represented by the formula (4) is more preferably used as the ring structure-containing vinyl-based monomer. The mixture may contain, in addition to the ring structure-containing vinyl-based monomer and (meth)acrylic acid and/or a salt thereof, another monofunctional monomer copolymerizable therewith or a polyfunctional monomer.

By the polymerization of the mixture, a hard polymer having, as a structural unit(s), the ring structure-containing vinyl-based monomer and/or (meth)acrylic acid and/or a salt thereof is formed. Examples of the ring structure-containing vinyl-based monomer, (meth)acrylic acid and/or a salt thereof, and another monofunctional monomer copolymerizable therewith are the same as those mentioned above, and these examples can be preferably used and their contents are also the same as those described above. Examples of the polyfunctional monomer are the same as those mentioned above, and these examples can be preferably used.

The (meth)acrylic rubber-containing polymer particles shall be polymer particles obtained by multistep polymerization and containing at least (meth)acrylic rubber. The (meth)acrylic rubber-containing polymer particles preferably have a rubber ((meth)acrylic cross-linked polymer) part obtained by polymerization of 50 to 100 wt % of acrylic ester, 50 to 0 wt % of another monofunctional monomer copolymerizable with the acrylic ester, and 0.05 to 10 parts by weight of a polyfunctional monomer (per 100 parts by weight of the total amount of the acrylic ester and the another monofunctional monomer copolymerizable therewith). The rubber part may be obtained by one-step polymerization performed by mixing all the monomer components or by polymerization performed in two or more steps by changing the composition of monomers.

The (meth)acrylic rubber-containing polymer particles are not particularly limited as long as a (meth)acrylic cross-linked polymer (rubber part) is formed in at least one of the steps of multistep polymerization, and polymerization for forming a hard polymer may be performed before and/or after the polymerization for forming a (meth)acrylic cross-linked polymer.

Particularly, from the viewpoint of productivity, the multi-layered particles (E) are preferably made of a (meth)acrylic rubber-containing graft copolymer produced by (b-1) polymerization of a monomer mixture comprising 50 to 100 wt % of acrylic ester, 50 to 0 wt % of another monofunctional monomer copolymerizable therewith, and 0.05 to 10 parts by weight of a polyfunctional monomer (per 100 parts by weight of the total amount of the acrylic ester and the another monofunctional monomer copolymerizable therewith) to obtain (meth)acrylic rubber-containing polymer particles and (b-2) in the presence of the (meth)acrylic rubber-containing polymer particles, polymerization of a monomer mixture comprising 1 to 100 wt % of a ring structure-containing vinyl-based monomer, 99 to 0 w % of another monofunctional monomer copolymerizable therewith, and 0 to 2.0 parts by weight of a polyfunctional monomer (per 100 parts by weight of the total amount of the ring structure-containing vinyl-based monomer and the another monofunctional monomer copolymerizable therewith) or a monomer mixture comprising 1 to 99.9 wt % of the ring-structure-containing vinyl-based monomer, 0.1 to 30 wt % of (meth)acrylic acid and/or a salt thereof, 98.9 to 0 wt % of another monofunctional monomer copolymerizable therewith, and 0 to 2.0 part by weight of a polyfunctional monomer (per 100 parts by weight of the total amount of the ring structure-containing vinyl-based monomer, the (meth)acrylic acid and/or the salt thereof, and the another monofunctional monomer copolymerizable therewith). Here, the polymerization of the monomer mixture in the step (b-1) and/or the polymerization of the monomer mixture in the step (b-2) may be performed in one step by mixing all the monomer components or in two or more steps by changing the composition of monomers. Further, examples of the acrylic ester, the another monofunctional monomer copolymerizable therewith, and the polyfunctional monomer used in the step (b-1) and preferred amounts thereof to be used are the same as those described above with reference to the (meth)acrylic cross-linked polymer. Examples of the components of the monomer mixture used in the step (b-2) and preferred amounts thereof to be used are the same as those described above with reference to the hard polymer layer.

The volume-average particle diameter to the (meth) acrylic rubber layer of the (meth)acrylic rubber-containing graft copolymer is measured in the same manner as the volume-average particle diameter to the (meth)acrylic cross-linked polymer layer of the multi-layered particles (E), and the preferred range thereof is also the same as that of the multi-layered particles (E).

When the multi-layered particles (E) are produced by emulsion polymerization, the emulsion polymerization can be performed by a conventional method using a known emulsifying agent. Specific examples of the emulsifying agent include anionic surfactants such as sodium alkyl sulfonate, sodium alkylbenzene sulfonate, sodium dioctyl-sulfosuccinate, sodium lauryl sulfate, fatty acid sodium, and phosphates such as sodium polyoxyethylene lauryl ether phosphate and nonionic surfactants such as reaction products of alkyl phenols or aliphatic alcohols and propylene oxide or ethylene oxide. These surfactants may be used singly or in combination of two or more of them. Further, if necessary, a cationic surfactant such as an alkylamine salt may be used. Among them, a phosphate (alkali metal or alkaline earth metal) such as sodium polyoxyethylene lauryl ether phosphate is particularly preferably used for polymerization from the viewpoint of improving the heat stability of resulting multi-layered particles (E).

When the multi-layered particles (E) are produced by emulsion polymerization in such a manner, a so-called latex is obtained in which primary particles of the multi-layered particles (E) are emulsified and dispersed in an aqueous phase. Such a multi-layered polymer latex of the multi-layered particles (E) often contains polymer particles or polymer blocks that are called scale and produced as a by-product in the step of multilayer polymerization for forming the multi-layered particles (E). The polymer particles or polymer blocks have a larger particle diameter and often partially or entirely have a cross-linked structure. Further, there is a case where foreign matter containing inorganic substances or dust contained in a vapor phase or water is mixed into the latex from the outside environment in the polymerization step. Mixing of the scale or foreign matter into the optical resin composition according to the present invention is undesirable because the scale or foreign matter causes optical defects in a resulting film. For this reason, for the purpose of reducing or removing the scale or foreign matter, the multi-layered polymer latex of the multi-layered particles (E) is preferably filtered through a mesh or filter. As the mesh or filter used for filtration, a widely-known one proposed for the purpose of filtering a liquid material can be used. The type, pore size, filter capacity, etc. of the mesh or filter may be appropriately selected depending on the size or desired removal rate of polymer scale produced as a by-product or foreign matter mixed into the latex as long as primary particles of the multi-layered particles (E) can pass through the pores of the mesh or filter.

The multi-layered polymer latex obtained by emulsion polymerization is subjected to known treatment such as spray drying, freeze drying, or treatment in which a coagulant such as a salt (e.g., calcium chloride or magnesium chloride) or an acid (e.g., hydrochloric acid or sulfuric acid) is added to coagulate a resin component and the resin component is separated from an aqueous phase by, if necessary, performing heat treatment or the like, washed, and dried, to obtain a powdered multi-layered polymer. When the polymer latex is coagulated to obtain a multi-layered polymer, a known coagulant such as an acid or a salt can be used, but a magnesium salt, especially magnesium sulfate, is particularly preferably used as a coagulant from the viewpoint of improving heat stability during molding of a resulting copolymer.

The multi-layered particles (E) are blended so that the amount of the cross-linked polymer contained in the multi-layered particles (E) per 100 parts by weight of the optical resin composition is preferably 1 to 60 parts by weight, more preferably 1 to 30 parts by weight, even more preferably 1 to 25 parts by weight. If the amount of the cross-linked polymer is less than 1 part by weight, there is a case where the crack resistance or vacuum moldability of a resulting film is deteriorated or a resulting film has poor optical isotropy due to an increase in photoelastic constant. On the other hand, if the amount of the cross-linked polymer exceeds 60 parts by weight, the heat resistance, surface hardness, transparency, or resistance to whitening on bending of a resulting film tends to be deteriorated.

The ratio between the matrix resin and the multi-layered particles (E) to be blended is not particularly limited as long as the above-described requirement for blending is satisfied. Depending on the amount of the cross-linked polymer contained in the multi-layered particles (E), the amount of the multi-layered particles (E) to be blended is preferably 1 to 99 wt %, more preferably 1 to 80 wt %, even more preferably 1 to 60 wt % when the total amount of the matrix resin and the multi-layered particles (E) is taken as 100 wt %. If the amount of the multi-layered particles (E) to be blended is less than 1 wt %, there is a case where the crack resistance or vacuum moldability of a resulting film is deteriorated or a resulting film has poor optical isotropy due to an increase in photoelastic constant. On the other hand, if the amount of the multi-layered particles (E) to be blended exceeds 99 wt %, the heat resistance, surface hardness, transparency, or resistance to whitening on bending of a resulting film tends to be deteriorated.

The optical resin composition according to the present invention is a light-permeable resin composition, and can be applied for various applications requiring optical permeability. Examples of the applications of the optical resin composition according to the present invention include, but are not limited to, film-, plate-, and lens-like optical members for use in various optical devices (e.g., films, substrates, and prism sheets for use in liquid crystal display devices; lenses in lens systems for signal reading of optical disk devices; Fresnel lenses and lenticular lenses for projection screens).

The optical resin composition according to the present invention may be subjected to molding, such as extrusion molding, injection molding, compression molding, blow molding, or spinning molding, on heating by directly mixing particulate components of the optical resin composition or after pelletization using an extruder to obtain a molded article having a shape suitable for its intended use. The optical resin composition according to the present invention is particularly useful as a film, and is successfully processed by, for example, a conventional melt extrusion method such as an inflation method or a T-die extrusion method, a calendering method, or a solvent casting method. Among them, a melt extrusion method using no solvents is particularly preferred. The use of a melt extrusion method makes it possible to reduce production cost or loads to the global environment or working environment caused by solvents.

From the viewpoint of obtaining a molded body that does not exhibit birefringence resulting from molding processing and can be practically used without problem, the value of orientation birefringence of the optical resin composition according to the present invention is preferably $-15 \times 10^{-4}$ to $15 \times 10^{-4}$, more preferably $-10 \times 10^{-4}$ to $10 \times 10^{-4}$, even more preferably $-5 \times 10^{-4}$ to $5 \times 10^{-4}$. Further, from the viewpoint of obtaining stable optical characteristics, the value of orientation birefringence of the optical resin composition according to the present invention is preferably $-2.6 \times 10^{-4}$ to $2.6 \times 10^{-4}$, more preferably $-2.1 \times 10^{-4}$ to $2.1 \times 10^{-4}$, even more preferably $-1.7 \times 10^{-4}$ to $1.7 \times 10^{-4}$, even more preferably $-1.6 \times 10^{-4}$ to $1.6 \times 10^{-4}$, even more preferably $-1.5 \times 10^{-4}$ to $1.5 \times 10^{-4}$, even more preferably $-1.0 \times 10^{-4}$ to $1.0 \times 10^{-4}$, particularly preferably $-0.5 \times 10^{-4}$ to $0.5 \times 10^{-4}$, most preferably $-0.2 \times 10^{-4}$ to $0.2 \times 10^{-4}$. Here, the orientation birefringence is a measured value of birefringence at the time when a 125 μm-thick film (original film) formed by molding the optical resin composition is uniaxially stretched in twice (stretched 100%) in its length direction. The details will be described later in Examples.

From the viewpoint of obtaining a molded body whose birefringence resulting from the application of stress in an environment of, for example, high temperature and high humidity is low, the photoelastic constant of the optical resin composition according to the present invention is preferably $-10 \times 10^{-12}$ to $10 \times 10^{-12}$ Pa$^{-1}$, more preferably $-4 \times 10^{-12}$ to $4 \times 10^{-12}$ pa$^{-1}$, even more preferably $-2 \times 10^{-12}$ to $2 \times 10^{-12}$ Pa$^{-1}$, even more preferably $-1.5 \times 10^{-12}$ to $1.5 \times 10^{-12}$ Pa$^{-1}$, particularly preferably $-1 \times 10^{-12}$ to $1 \times 10^{-12}$ Pa$^{-1}$, more particularly preferably $-0.5 \times 10^{-12}$ to $0.5 \times 10^{-12}$ Pa$^{-1}$, most preferably $-0.3 \times 10^{-12}$ to $0.3 \times 10^{-12}$ Pa$^{-1}$. When the optical resin composition having a photoelastic constant of $-4 \times 10^{-12}$ to $4 \times 10^{-12}$ Pa$^{-1}$ is formed into a film and the film is used in a liquid crystal display device, a phase difference variation, a reduction in the contrast of peripheral area of a display screen, and light leakage do not occur. Here, the photoelastic constant is a value determined in the following manner. The optical resin composition is molded into a 125 μm-thick film (original film). Then, one of the long sides of the film is fixed, and in this state, birefringence is measured while a load applied to the other long side is increased from 0 kgf to 4 kgf by 0.5-kgf increments. The magnitude of a change in birefringence per unit stress is calculated from the obtained result to determine a photoelastic constant. The details will be described later in Examples.

When the optical resin composition according to the present invention is molded to obtain a molded body (125 μm thick), the total light transmittance of the molded body is preferably 85% or more, more preferably 90% or more, even more preferably 92% or more from the viewpoint of transparency. Further, when the optical resin composition is molded to obtain a molded body (125 μm thick), the haze of the molded body is preferably 2.0% or less, more preferably 1.5% or less, even more preferably 1.0% or less, even more preferably 0.8% or less, particularly preferably 0.5% or less.

Further, the optical resin composition according to the present invention preferably has high mechanical strength. The mechanical strength can be evaluated by, for example, tensile elongation at breakage in a tensile test, and the tensile elongation at breakage of the optical resin composition according to the present invention is preferably 10% or more, more preferably 20% or more, even more preferably 30% or more, even more preferably 40% or more, particularly preferably 50% or more, more particularly preferably 60% or more, most preferably 90% or more. The optical resin composition according to the present invention having a tensile elongation at breakage within the above range does not cause a problem such as cracking during molding processing, and is therefore extremely excellent in productivity. Further, when a product using the optical resin composition according to the present invention is actually used, trouble such as cracking does not occur. The occurrence of cracking is particularly correlated with tensile elongation at breakage, and a higher tensile elongation at breakage means higher crack resistance.

When the optical resin composition according to the present invention is molded into a film, both surfaces of the film may be brought into contact with (sandwiched between) rolls or metal belts, especially rolls or metal belts heated to a temperature around the glass transition temperature of the film, at the same time, if necessary, so that the film has higher surface properties. Further, the film may be subjected to lamination molding or may be modified by biaxial stretching depending on its intended use.

The optical resin composition according to the present invention can be formed into a film even under such high-temperature molding conditions that a T-die film molding machine is used without causing contamination of the molding machine due to scattering of a UV absorber or film defects.

Hereinbelow, one embodiment of a method for producing a film according to the present invention will be described in detail with reference to a case where the optical resin composition according to the present invention is molded into a film by melt extrusion.

It is to be noted that in the following description, a film molded by melt extrusion is referred to as "melt-extruded film" to differentiate it from a film molded by another method such as solution casting.

When the optical resin composition according to the present invention is molded into a film by melt extrusion, the optical resin composition according to the present invention is first supplied to an extruder and melted by heating.

The optical resin composition is preferably subjected to predrying before supplied to the extruder. By performing such predrying, it is possible to prevent foaming of the resin extruded from the extruder.

A method for predrying is not particularly limited, but for example, a raw material (i.e., the optical resin composition according to the present invention) may be predried by a hot air drier or the like after formed into pellets or the like.

Further, the extruder for molding the optical resin composition according to the present invention preferably has one or more devolatilizers for removing volatile matter produced during melting by heating. By providing one or more devolatilizers, it is possible to reduce deterioration of film appearance due to foaming or decomposition/deterioration reaction of the resin.

Further, during melt extrusion for molding the optical resin composition according to the present invention, an inert gas such as nitrogen or helium is preferably supplied to a cylinder of the extruder together with the resin material. By supplying an inert gas, it is possible to reduce the concentration of oxygen in a system to reduce decomposition caused by oxidation degradation, cross-linking, or degradation of appearance or quality such as yellowing.

Then, the optical resin composition melted by heating in the extruder is supplied through a gear pump or a filter to a T-die. By using a gear pump at this time, it is possible to improve uniformity of the amount of the resin to be extruded to reduce a thickness variation. On the other hand, the use of a filter makes it possible to remove foreign matter in the optical resin composition to obtain a film having excellent appearance without defects.

The filter to be used is preferably a stainless steel leaf-disk type filter that can remove foreign matter from a melted polymer, and a filter element to be used is preferably of fiber type, powder type, or complex type thereof. The filter can be preferably used for an extruder or the like for use in pelletization or film formation.

Then, the optical resin composition supplied to the T-die is extruded through the T-die as a sheet-shaped melted resin.

The sheet-shaped melted resin is preferably sandwiched between two cooling rolls and then cooled to form a film.

One of the two cooling rolls sandwiching the sheet-shaped melted resin is preferably a rigid metal roll having a smooth surface and the other cooling roll is preferably a flexible roll having an elastic deformable metal elastic external cylinder having a smooth surface.

By cooling the sheet-shaped melted resin sandwiched between such rigid metal roll and flexible roll having a metal elastic external cylinder, it is possible to correct surface microirregularities or die lines to obtain a film having a smooth surface and a thickness variation of 5 μm or less.

It is to be noted that the term "cooling roll" used in this specification includes the meaning of "touch roll" and "cooling roll".

Even when the above-described rigid metal roll and flexible roll are used, there is a case where, when a film to be formed is thin, the surfaces of the cooling rolls come into contact with each other so that the external surfaces of the cooling rolls are damaged or the cooling rolls themselves are broken because both the cooling rolls have a metallic surface.

Therefore, when sandwiched between such two cooling rolls as described above to form a film, the sheet-shaped melted resin is first sandwiched between the two cooling rolls and then cooled to obtain a film.

The thus obtained film according to the present invention exhibits substantially no orientation birefringence even when stretched and has optical isotropy. Further, the film according to the present invention is less likely to thermally shrink during secondary molding such as vacuum molding or during use at high temperature. Further, by subjecting the film according to the present invention to a stretching step, it is possible to improve strength and film thickness accuracy. Further, the optical resin composition according to the present invention is excellent in optical isotropy, and therefore the allowable range of stretching conditions is wide, and a film that exhibits substantially no birefringence and substantially no increase in haze and has a small thickness variation can be easily produced.

When the film according to the present invention is a stretched film, the stretched film (uniaxially-stretched film or biaxially-stretched film) can be produced by once molding the optical resin composition according to the present invention to form an unstretched film and then by subjecting the unstretched film to uniaxial stretching or biaxial stretching. For example, a sheet-shaped melted resin is sandwiched between the above-described two cooling rolls and then cooled to once obtain an unstretched film having a thickness of 150 μm. Then, the film is subjected to vertical and horizontal biaxial stretching to have a thickness of 40 μm.

In this specification, for convenience of description, an unstretched film that is obtained by molding the optical resin composition according to the present invention but is not subjected to stretching is referred to as "raw material film".

When stretched, the raw material film may be continuously subjected to stretching just after molding or may be subjected to stretching after once stored or transferred after molding.

It is to be noted that when stretched just after molding, the raw material film may be stretched very shortly (in some cases, instantaneously) after molding in a film production process or may be stretched some time after once produced.

When the film according to the present invention is a stretched film, the raw material film shall be kept in a film form good enough to be stretched and does not always need to be in a perfect film state.

A method for stretching the raw material film is not particularly limited, and a conventionally-known any stretching method may be used. More specifically, the raw material film may be subjected to, for example, lateral stretching using a tenter, longitudinal stretching using a roll, or sequential biaxial stretching in which such lateral stretching and longitudinal stretching are sequentially performed.

Alternatively, the stretching method may be a simultaneous biaxial stretching method in which lateral stretching and longitudinal stretching are simultaneously performed or a method in which longitudinal stretching using a roll is performed and then lateral stretching using a tenter is performed.

When stretched, the raw material film is preferably once preheated to a temperature higher than a stretching temperature by 0.5° C. to 5° C., preferably 1° C. to 3° C. and then cooled to the stretching temperature before stretching.

By preheating the raw material film to a temperature within the above range, it is possible to accurately maintain the thickness of the raw material film or to prevent a resulting stretched film from having low thickness accuracy or a thickness variation. Further, it is possible to prevent the raw material film from adhering to a roll or sagging under its own weight.

On the other hand, if the preheating temperature of the raw material film is too high, an adverse effect, such as adhesion of the raw material film to a roll or sagging of the raw material film under its own weight, tends to occur. Further, if a difference between the preheating temperature and the stretching temperature of the raw material film is small, the raw material film before stretching tends to be difficult to maintain thickness accuracy or a resulting stretched film tends to have a large thickness variation or low thickness accuracy.

It is to be noted that when the optical resin composition according to the present invention is molded to form a raw material film and the raw material film is stretched, it is difficult to improve thickness accuracy by utilizing a necking phenomenon. Therefore, in the present invention, control of the above-described preheating temperature is important to maintain or improve the thickness accuracy of a resulting film.

The stretching temperature at which the raw material film is stretched is not particularly limited, and may be changed according to mechanical strength, surface properties, and thickness accuracy required for a stretched film to be produced.

In general, when the glass transition temperature of the raw material film determined by a DSC method is defined as Tg, the stretching temperature is preferably in the range of (Tg−30° C.) to (Tg+30° C.), more preferably in the range of (Tg−20° C.) to (Tg+20° C.), and even more preferably in the range of (Tg) to (Tg+20° C.).

When the stretching temperature is within the above range, it is possible to reduce the thickness variation of a resulting stretched film and to improve the mechanical properties of the film such as percentage of elongation, tear propagation strength, and resistance to flexural fatigue. Further, it is possible to prevent the occurrence of trouble such as adhesion of the film to a roll.

On the other hand, if the stretching temperature is higher than the above upper limit, a resulting stretched film tends to have a large thickness variation or the mechanical properties of the film, such as percentage of elongation, tear propagation strength, and resistance to flexural fatigue, tend not to be sufficiently improved. Further, trouble such as adhesion of the film to a roll tends to occur.

If the stretching temperature is lower than the above lower limit, a resulting stretched film tends to have a large haze or, in an extreme case, a problem, such as the occurrence of tears or cracks in the film, tends to occur during the production process.

When the raw material film is stretched, its stretching ratio is not particularly limited, either, and may be determined according to the mechanical strength, surface properties, and thickness accuracy of a stretched film to be produced. In general, depending on the stretching temperature, the stretching ratio is preferably in the range of 1.1 to 3 times, more preferably in the range of 1.3 to 2.5 times, even more preferably in the range of 1.5 to 2.3 times.

When the stretching ratio is within the above range, it is possible to significantly improve the mechanical properties of the film such as elongation percentage, tear propagation strength, and resistance to flexural fatigue. Therefore, it is possible to produce a stretched film that has a thickness variation of 5 µm or less, exhibits substantially no birefringence, and has a haze of 2.0% or less.

If necessary, the film according to the present invention may be used by laminating another film thereon with an adhesive or the like or by forming a coating layer such as a hard coating layer or the like on the surface thereof.

If necessary, the optical resin composition according to the present invention may be blended with birefringent inorganic microparticles described in Japanese Patent No. 3648201 or Japanese Patent No. 4336586 or a birefringent low-molecular compound having a molecular weight of 5000 or less, preferably 1000 or less described in Japanese Patent No. 3696649 to adjust orientation birefringence.

Further, the optical resin composition according to the present invention shall contain at least one kind of the resin (A) and at least one kind of the resin (B), and if necessary, at least one kind of the multi-layered particles (E), and one or more other resins may be added thereto without any particular limitation as long as the objects of the present invention can be achieved. Examples of the other resins include other thermoplastic resins, multi-layered polymers such as core-shell polymers and graft copolymers, and thermoplastic elastomers such as block polymers. Examples of the other thermoplastic resins include glutaric anhydride acrylic resins, lactonized acrylic resins, methacrylic resins, polyethylene terephthalate resins, and polybutylene terephthalate resins. A blending method is not particularly limited, and a known method can be used.

If necessary, the optical resin composition according to the present invention may contain a known additive or another resin. Examples of the additive include light stabilizers, UV absorbers, heat stabilizers, delustrants, light diffusers, colorants, dyes, pigments, antistatic agents, heat reflecting agents, lubricants, plasticizers, UV absorbers, stabilizers, and fillers.

If necessary, the surface gloss of the film according to the present invention may be reduced by a known method. This can be achieved by, for example, kneading an inorganic filler or cross-linked polymer particles with the optical resin composition. Alternatively, a film obtained from the optical resin composition may be embossed to reduce its surface gloss.

The film according to the present invention may be used by laminating on metal, plastic, glass, a material layer such as a printed layer, a decorative layer, or a protective layer, or the like. Examples of a method for laminating the film include lamination molding, wet lamination in which an adhesive is applied onto a metal plate such as a steel plate and then the film is laminated on and bonded to the metal plate by drying, dry lamination, extrusion lamination, and hot-melt lamination.

Examples of a method for laminating the film on a plastic part include insertion molding or laminate injection press molding in which a resin is injected into a mold in which a film is provided and in-mold molding in which a resin is injected into a mold in which a pre-molded film is provided.

An article on which the film according to the present invention is laminated can be used as, for example, substitutes for paint such as car interior materials and car exterior materials, building materials such as window frames, bathroom fitments, wallpapers, and floor materials, daily goods, housings for furniture or electrical equipment, housings for OA equipment such as facsimiles, laptop computers, and copy machines, front panels of liquid crystal displays of terminal equipment such as mobile phones, smartphones, and tablets, and parts of electric or electronic devices.

The film according to the present invention can be used for various purposes listed below for its properties such as heat resistance, transparency, and flexibility. More specifically, the film according to the present invention can be used for interior and exterior of cars, personal computers, mobile devices, solar batteries, and the like; solar battery backsheets; taking lenses for cameras, VTRs, and projectors; finders, filters, prisms, Fresnel lenses, lens covers, and the like for use in the field of imaging; lenses such as pick-up lenses for optical disc in CD players, DVD players, MD players, and the like for use in the field of lens; optical discs such as CDs, DVDs, and MDs for use in the field of optical recording; films for liquid crystal displays such as organic EL films, light guide plates, diffuser plates, backsheets, reflection sheets, polarizer protective films, polarizing films, transparent resin sheets, phase difference films, light diffusing films, prism sheets, and the like and surface protective films for use in the field of information devices; optical fibers, optical switches, optical connectors, and the like for use in the field of optical communications; car headlights, tail lamp lenses, inner lenses, instrument covers, sunroofs, and the like for use in the field of vehicles; medical devices such as eyeglasses, contact lenses, lenses for endoscopes, and medical supplies requiring sterilization for use in the medical field; road signs, bathroom fitments, floor materials, translucent panels for roads, lenses for double glazing, lighting windows, carports, lenses for lighting, lighting covers, sidings for construction materials, and the like for use in the fields of architecture and construction materials; microwave cooking vessels (dishes); housings for home appliances; toys; sunglasses; and stationary, etc. The film according to the present invention can be used also as a substitute for a molded article using a transfer foil sheet.

A molded article, other than a film, made of the optical resin composition according to the present invention can be used as, for example, lenses such as lenses for common cameras, lenses for video cameras, object lenses, diffraction gratings, holograms, and collimators for laser pickup, fθ lenses for laser printers, cylindrical lenses, condenser lenses or projector lenses for liquid crystal projectors, Fresnel lenses, and lenses for eyeglasses, disc substrates for compact discs (e.g., CDs and CD-ROMs), mini discs (MDs), and DVDs, members for liquid crystal elements such as light guide plates for LCDs, films for LCDs, substrates for LCDs, and adhesives for bonding liquid crystal elements, screens for projectors, optical filters, optical fibers, optical waveguides, prisms, lenses for lighting, car headlights, medical supplies requiring sterilization, microwave cooking vessels, housings for home appliances, toys, and recreation items.

The film according to the present invention can have an orientation birefringence of $-2.6 \times 10^{-4}$ to $2.6 \times 10^{-4}$, a photoelastic constant of $-4 \times 10^{-12}$ to $4 \times 10^{-12}$, and a thickness of 10 μm or more but 500 μm or less. Particularly, the film according to the present invention is excellent in optical characteristics such as optical homogeneity and transparency. Further, addition of the multi-layered particles (E) makes it possible to improve mechanical strength. The film according to the present invention preferably satisfies a tensile elongation at breakage of 10% or more. Therefore, utilizing such optical characteristics, the film according to the present invention can be particularly suitable for use in known optics applications such as liquid crystal display peripherals or organic EL device peripherals such as surface protective films, light guide plates for liquid crystal displays, diffuser plates, back sheets, reflection sheets, polarizing films, transparent resin sheets, phase difference films, prism sheets, optical isotropic films, polarizer protective films, and transparent conductive films.

The film according to the present invention may be bonded to a polarizer to be used as a polarizing plate. That is, the film according to the present invention may be used as a polarizer protective film of a polarizing plate. The polarizer is not particularly limited and may be any conventionally-known polarizer. A specific example of such a polarizer is iodine-doped stretched polyvinyl alcohol. Examples of a method used to bond the film according to the present invention to a polarizer include various bonding methods generally used for acrylic films such as a method in which a primer such as a cellulose-based resin is applied to a polarizer, and then the film according to the present invention is bonded to the polarizer with an aqueous adhesive such as a polyvinyl alcohol-based adhesive and a method in which the film according to the present invention is directly bonded to a polarizer with a curable resin adhesive by UV irradiation or the like.

If necessary, the film according to the present invention may be subjected to surface treatment. For example, when subjected to surface finishing such as coating or laminated on the surface of another film, the film according to the present invention is preferably subjected to surface treatment. By subjecting the film according to the present invention to such surface treatment, it is possible to improve adhesion between the film according to the present invention and a coating material or another film to be laminated.

It is to be noted that the purpose of surface treatment of the film according to the present invention is not limited to the above purposes. The film according to the present invention may be subjected to surface treatment regardless of its intended use. Such surface treatment is not particularly limited, and examples thereof include corona treatment, plasma treatment, ultraviolet irradiation, and alkali treatment. Among them, corona treatment is preferred.

The thickness of the film according to the present invention is not particularly limited, but is preferably 500 μm or less, more preferably 300 μm or less, particularly preferably 200 μm or less. Further, the thickness of the film according to the present invention is preferably 10 μm or more, more preferably 30 μm or more, even more preferably 50 μm or more, particularly preferably 100 μm or more. The film according to the present invention having a thickness within the above range is advantageous in that the film is less likely to be deformed when subjected to vacuum molding and therefore a deep-drawn portion is less likely to be broken, and can have uniform optical characteristics and excellent transparency. On the other hand, if the thickness of the film exceeds the above upper limit, the film after molding is non-uniformly cooled and therefore tends to have non-uniform optical characteristics. If the thickness of the film is less than the above lower limit, there is a case where the film is difficult to handle.

The film according to the present invention preferably has a haze value (125 μm thick) of 2.0% or less, more preferably 1.0% or less, even more preferably 0.8% or less, particularly preferably 0.5% or less. When the film according to the present invention has a haze value within the above range, its transparency is sufficiently high and therefore the film is suitable for optics applications, decorative applications, interior applications, or vacuum molding applications requiring transparency.

The film according to the present invention preferably has a total light transmittance (125 μm thick) of 85% or higher, more preferably 88% or higher. When the film according to the present invention has a total light transmittance within the above range, its transparency is sufficiently high and therefore the film is suitable for optics applications, decorative applications, interior applications, or vacuum molding application requiring transparency.

The film according to the present invention preferably has a glass transition temperature of 100° C. or higher, more preferably 115° C. or higher, even more preferably 120° C. or higher, even more preferably 124° C. or higher. When having a glass transition temperature within the above range, the film according to the present invention can have sufficiently high heat resistance.

The film according to the present invention preferably has a tensile elongation at breakage of 10% or more, more preferably 20% or more, even more preferably 30% or more, even more preferably 40% or more, particularly preferably 50% or more, more particularly preferably 60% or more, most preferably 90% or more. When having a tensile elongation at breakage within the above range, the film according to the present invention is less likely to be cracked when cut out with a Thomson blade or a cutter blade (trimming property) and is less likely to be broken when rolled up or when the surface thereof is subjected to after-processing such as coating, vapor deposition, sputtering, or bonding to a protective film. Further, the film has high crack resistance against bending, and therefore trouble such as cracking does not occur not only when the film is subjected to after-processing but also when the film is practically used as a product. The occurrence of cracking is particularly correlated with tensile elongation at breakage, and a higher tensile elongation at breakage means higher crack resistance.

As described above, the film according to the present invention can be used as an optical film. Particularly, when used as a polarizer protective film, the film according to the present invention preferably has low optical anisotropy. Particularly, the optical anisotropy of the film is preferably low not only in its in-plane direction (length and width directions) but also in its thickness direction. In other words, both the in-plane phase difference and the absolute value of the thickness-direction phase difference of the film are preferably small. More specifically, the in-plane phase difference is preferably 10 nm or less, more preferably 6 nm or less, even more preferably 5 nm or less, even more preferably 3 nm or less. The absolute value of the thickness-direction phase difference is preferably 50 nm or less, more preferably 20 nm or less, even more preferably 10 nm or less, most preferably 5 nm or less. The film having such a phase difference can be preferably used as a polarizer protective film of a polarizing plate in a liquid crystal display device. On the other hand, if the film having an in-plane phase difference exceeding 10 nm or a thickness-direction phase difference absolute value exceeding 50 nm is used as a polarizer protective film of a polarizing plate in a liquid crystal display device, there is a case where a problem such as a reduction in the contrast of the liquid crystal display device occurs.

Phase difference is an index value calculated based on birefringence, and in-plan phase difference (Re) and thickness-direction phase difference (Rth) can be calculated by the following formulas, respectively. In the case of an ideal film that is completely optically isotropic in three dimensional directions, its in-plane phase difference Re and thickness-direction phase difference Rth are both 0.

$$Re=(nx-ny)\times d$$

$$Rth=((nx+ny)/2-nz)\times d$$

In the above formulas, nx, ny, and nz represent a refractive index in an X-axis direction that is an in-plane stretching direction (orientation direction of polymer chains), a refractive index in a Y-axis direction that is a direction perpendicular to the X axis, and a refractive index in a Z-axis direction that is a film thickness direction, respectively, d represents a film thickness, and nx−ny represents orientation birefringence. It is to be noted that in the case of a melt-extruded film, MD direction corresponds to the X axis, and in the case of a stretched film, a stretching direction corresponds to the X axis.

The value of orientation birefringence of a molded body made of the optical resin composition according to the present invention is preferably $-15\times10^{-4}$ to $15\times10^{-4}$, more preferably $-10\times10^{-4}$ to $10\times10^{-4}$, even more preferably $-5\times10^{-4}$ to $5\times10^{-4}$, even more preferably $-1.6\times10^{-4}$ to $1.6\times10^{-4}$, particularly preferably $-1\times10^{-4}$ to $1\times10^{-4}$, more particularly preferably $-0.5\times10^{-4}$ to $0.5\times10^{-4}$, most preferably $-0.2\times10^{-4}$ to $0.2\times10^{-4}$. When the orientation birefringence of the molded body is within the above range, the molded body does not exhibit birefringence resulting from molding processing and therefore can be practically used without problem.

Further, the value of orientation birefringence of a film made of the optical resin composition according to the present invention is preferably $-2.6\times10^{-4}$ to $2.6\times10^{-4}$, more preferably $-2.1\times10^{-4}$ to $2.1\times10^{-4}$, even more preferably $-1.7\times10^{-4}$ to $1.7\times10^{-4}$, even more preferably $-1.6\times10^{-4}$ to $1.6\times10^{-4}$, even more preferably $-1.5\times10^{-4}$ to $1.5\times10^{-4}$, even more preferably $-1.0\times10^{-4}$ to $1.0\times10^{-4}$, particularly preferably $-0.5\times10^{-4}$ to $0.5\times10^{-4}$, most preferably $-0.2\times10^{-4}$ to $0.2\times10^{-4}$. When the orientation birefringence of the film is within the above range, the film does not exhibit birefringence resulting from molding processing and therefore can have stable optical characteristics. Further, the film is very suitable as an optical film for use in liquid crystal displays and the like.

The photoelastic constant of a molded body made of the optical resin composition according to the present invention is preferably $-10\times10^{-12}$ to $10\times10^{-12}$, more preferably $-4\times10^{-12}$ to $4\times10^{-12}$, even more preferably $-2\times10^{-12}$ to $2\times10^{-12}$, even more preferably $-1\times10^{-12}$ to $1\times10^{-12}$, even more preferably $-0.5\times10^{-12}$ to $0.5\times10^{-12}$, most preferably $-0.3\times10^{-12}$ to $0.3\times10^{-12}$. When the photoelastic constant of the molded body is within the above range, the molded body exhibits only small birefringence even when stress is applied thereto in an environment of, for example, high temperature and high humidity, and therefore can be practically used without problem.

The photoelastic constant of a film made of the optical resin composition according to the present invention is preferably $-4\times10^{-12}$ Pa$^{-1}$ to $4\times10^{-12}$ Pa$^{-1}$, more preferably $-1.5\times10^{-12}$ Pa$^{-1}$ to $1.5\times10^{-12}$ Pa$^{-1}$, even more preferably $-1.0\times10^{-12}$ Pa$^{-1}$ to $1.0\times10^{-12}$ Pa$^{-1}$, even more preferably $-0.5\times10^{-12}$ Pa$^{-1}$ to $0.5\times10^{-12}$ Pa$^{-1}$, most preferably $-0.3\times10^{-12}$ Pa$^{-1}$ to $0.3\times10^{-12}$ Pa$^{-1}$. When the film according to the present invention having a photoelastic constant within the above range is used in a liquid crystal display device, the molded body exhibits only small birefringence even when stress is applied thereto in an environment of, for example, high temperature and high humidity, and therefore a phase difference variation, a reduction in the contrast of peripheral area of a display screen, and light leakage do not occur.

The value of orientation birefringence of the stretched film according to the present invention is preferably $-5.0\times10^{-4}$ to $5.0\times10^{-4}$, more preferably $-3.0\times10^{-4}$ to $3.0\times10^{-4}$, even more preferably $-2.6\times10^{-4}$ to $2.6\times10^{-4}$, even more preferably $-1.0\times10^{-4}$ to $1.0\times10^{-4}$, most preferably $-0.5\times10^{-4}$ to $0.5\times10^{-4}$. When the orientation birefringence of the film is within the above range, the film does not exhibit birefringence resulting from molding processing and therefore can have stable optical characteristics. Further, the film is very suitable as an optical film for use in liquid crystal displays and the like.

The photoelastic constant of the stretched film according to the present invention is preferably $-4\times10^{-12}$ Pa$^{-1}$ to $4\times10^{-12}$ Pa$^{-1}$, more preferably $-1.5\times10^{-12}$ Pa$^{-1}$ to $1.5\times10^{-12}$ Pa$^{-1}$, even more preferably $-1.0\times10^{-12}$ Pa$^{-1}$ to $1.0\times10^{-12}$ Pa$^{-1}$, even more preferably $-0.5\times10^{-12}$ Pa$^{-1}$ to $0.5\times10^{-12}$ Pa$^{-1}$, most preferably $-0.3\times10^{-12}$ Pa$^{-1}$ to $0.3\times10^{-12}$ Pa$^{-1}$. When the film according to the present invention having a photoelastic constant within the above range is used in a liquid crystal display device, the molded body exhibits only small birefringence even when stress is applied thereto in an environment of, for example, high temperature and high humidity, and therefore a phase difference variation, a reduction in the contrast of peripheral area of a display screen, and light leakage do not occur.

EXAMPLES

Hereinbelow, the present invention will be described more specifically with reference to examples, but is not limited to these examples. In the following description, "part(s)" and "%" represent "part(s) by weight" and "wt %", respectively unless otherwise specified.

(Volume-Average Particle Diameter to (Meth)Acrylic Cross-Linked Polymer Layer of Multi-Layered Particles (E))

The volume-average particle diameter to the (meth) acrylic cross-linked polymer layer of a graft copolymer (multi-layered particles (E)) (volume-average particle diameter of acrylic rubber particles) was measured using an acrylic rubber particle latex. The measurement of the volume-average particle diameter (μm) was performed using, as a measuring instrument, MICROTRAC UPA150 manufactured by NIKKISO CO., LTD.

(Polymerization Conversion Ratio)

First, part of an obtained slurry was sampled and accurately weighed, dried in a hot-air drier at 120° C. for 1 hour, and then accurately weighed to determine the weight of solid matter. Then, the ratio between the results of accurate measurement before and after drying was determined as the solid content of the slurry. Finally, a polymerization conversion ratio was calculated by the following formula using the solid content. It is to be noted that in this calculation formula 1, a chain transfer agent was regarded as a monomer charged.

Polymerization conversion ratio (%)=[(total weight of raw materials charged×solid content−total weight of raw materials other than water and monomers)/weight of monomers charged]×100

(Graft Ratio)

Two grams of the graft copolymer (multi-layered particles (E)) obtained was dissolved in 50 mL of methyl ethyl ketone, and the solution was separated into insoluble matter and soluble matter by centrifugation using a centrifugal separator (CP60E manufactured by Hitachi Koki Co., Ltd.) at 30000 rpm for 1 hour (three sets of centrifugation were performed in total). The thus obtained insoluble matter was used to calculate a graft ratio by the following formula.

Graft ratio (%)={(weight of methyl ethyl ketone insoluble matter−weight of cross-linked polymer layer)/weight of cross-linked polymer layer}×100

It is to be noted that the weight of a cross-linked polymer layer refers to the weight of monofunctional monomers charged and constituting the cross-linked polymer layer.

(Imidization Ratio)

An imidization ratio was calculated in the following manner using IR. Pellets of a product were dissolved in methylene chloride to obtain a solution, and the IR spectrum of the solution was measured at room temperature using TravelIR manufactured by SensIR Technologies. From the obtained IR spectrum, the absorption intensity of ester carbonyl groups at 1720 $cm^{-1}$ (Absester) and the absorption intensity of imide carbonyl groups at 1660 $cm^{-1}$ (Absimide) were determined, and the ratio between them was determined as an imidization ratio (Im % (IR)). The term "imidization ratio" used herein refers to the ratio of imide carbonyl groups to the total carbonyl groups.

(Glutarimide Unit Content)

A resin was subjected to $^1$H-NMR analysis using $^1$H-NMR BRUKER AvanceIII (400 MHz) to determine the amount of each monomer unit (mol %), such as a glutarimide unit or an ester unit, contained in the resin, and the monomer unit content (mol %) was converted to a monomer unit content (wt %) using the molecular weight of each monomer unit.

(Acid Value)

An obtained glutarimide acrylic resin of 0.3 g was dissolved in a mixed solvent of 37.5 mL of methylene chloride and 37.5 mL of methanol. Two drops of a phenolphthalein ethanol solution were added, and then 5 mL of a 0.1N aqueous sodium hydroxide solution was added. Then, the excess base was titrated with 0.1N hydrochloric acid, and a difference between the amount of the base added and the amount of hydrochloric acid used before neutralization was accomplished expressed in milliequivalent was determined as an acid value.

(Refractive Index)

Each composition was processed into a sheet, and the refractive index (nD) of the glutarimide acrylic resin was measured at the sodium D-line wavelength in accordance with JIS K7142 using an Abbe refractometer 2T manufactured by ATAGO CO., LTD.

(Glass Transition Temperature)

The temperature of a sample was once increased to 200° C. at a rate of 25° C./min by a differential scanning calorimetry (DSC) SSC-5200 manufactured by Seiko Instruments Inc., held at 200° C. for 10 minutes, and decreased to 50° C. at a rate of 25° C./min to preliminarily adjust the temperature of the sample, and then the DSC curve of the sample was measured while the temperature of the sample was increased to 200° C. at a temperature rise rate of 10° C./min. The integral of the obtained DSC curve (DDSC) was determined, and the glass transition temperature of the sample was determined from its maximum point.

(Total Light Transmittance and Haze Value)

The total light transmittance and haze value of a film were measured by a method specified in JIS K7105 using NDH-300A manufactured by NIPPON DENSHOKU INDUSTRIES CO., LTD.

(Film Thickness)

The film thickness of a film was measured using a digimatic indicator (manufactured by Mitutoyo Corporation).

(Preparation of Uniaxially-Stretched Film and Measurement of Orientation Birefringence)

A 25 mm×90 mm test specimen is cut out from an unstretched original film having a thickness of 125 μm obtained in each of Examples and Comparative Examples (so that its longitudinal direction is parallel to MD), both the short sides of the test specimen are held while the test specimen is maintained at a temperature higher by 30° C. than its glass transition temperature for 2 minutes, and the test specimen is uniaxially stretched twice (also referred to as "stretched 100%") at a rate of 200 mm/min in the longitudinal direction (at this time, both the long sides of the test specimen are not fixed). Thereafter, the thus obtained film was cooled to 23° C., and a sample was taken from the central portion of the film to measure birefringence (orientation birefringence) with the use of an automatic double refraction meter (KOBRA-WR manufactured by Oji Scientific Instruments) at a temperature of 23±2° C., a humidity of 50±5%, a wavelength of 590 nm, and an incidence angle of 0°. At the same time, the in-plane phase difference Re and the thickness-direction phase difference Rth (incidence angle: 40°) of the test specimen were also measured (measurement of in-plane phase difference Re and thickness-direction phase difference Rth will be described in detail later).

It is to be noted that the orientation birefringence of the multi-layered particles (E) themselves was measured using a 500 μm-thick press molded sheet prepared by pressing only the multi-layered particles (E) at 190° C. A 25 mm×90 mm test specimen was cut out from the central portion of the obtained press molded sheet and stretched in the same manner as described above, and the orientation birefringence of the test specimen was measured in the same manner as described above.

(Orientation Birefringence of Original Film)

A 40 mm×40 mm test specimen was cut out from an unstretched original film (thickness: 125 μm) obtained in each of Examples and Comparative Examples, and the orientation birefringence of the test specimen was measured using an automatic double refraction meter (KOBRA-WR manufactured by Oji Scientific Instruments) at a temperature of 23±2° C., a humidity of 50±5%, a wavelength of 590 nm, and an incidence angle of 0°. At the same time, the in-plane phase difference Re and the thickness-direction phase difference Rth (incidence angle: 40°) of the test specimen were also measured (measurement of in-plane phase difference Re and thickness-direction phase difference Rth will be described in detail later).

(In-Plane Phase Difference Re and Thickness-Direction Phase Difference Rth)

A 40 mm×40 mm test specimen was cut out from a 125 μm-thick unstretched film (original film) obtained in each of Examples and Comparative Examples. The in-plane phase difference Re of the test specimen was measured using an automatic double refraction meter (KOBRA-WR manufactured by Oji Scientific Instruments) at a temperature of 23±2° C., a humidity of 50±5%, a wavelength of 590 nm, and an incidence angle of 0°.

From the thickness d of the test specimen measured using a digimatic indicator (manufactured by Mitutoyo Corporation), the refractive index n measured using an Abbe refractometer (3T manufactured by ATAGO CO., LTD.), and the in-plane phase difference Re and the phase difference in a direction inclined at 40° measured using the automatic double refraction meter at a wavelength of 590 nm, three-dimensional refractive indexes nx, ny, and nz were determined to calculate a thickness-direction phase difference, Rth=((nx+ny)/2−nz)× d. It is to be noted that the measured value was multiplied by 100 (μm)/film thickness (μm) to be converted to a value per 100 μm thickness, and the thus obtained value is shown in Table 2.

(Photoelastic Constant)

A strip-shaped test specimen of 15 mm×90 mm was cut out (so that its longitudinal direction was parallel to TD) from a 125 μm-thick unstretched film (original film) obtained in each of Examples and Comparative Examples. The photoelastic constant of the test specimen was measured using an automatic double refraction meter (KOBRA-WR manufactured by Oji Scientific Instruments) at a temperature of 23±2° C., a humidity of 50±5%, a wavelength of 590 nm, and an incidence angle of 0°. The measurement was performed in the following manner: one of the long sides of the film was fixed and birefringence was measured while a load applied to the other long side was increased from 0 kgf to 4 kgf by 0.5-kgf increments, and from the obtained results, the magnitude of a change in birefringence per unit stress was determined.

It is to be noted that the photoelastic constant of the multi-layered particles (E) themselves was measured using a 500 μm-thick press molded sheet prepared by pressing only the multi-layered particles (E) at 190° C. A 15 mm×90 mm test specimen was cut out from the central portion of the obtained press molded sheet, and the photoelastic constant of the test specimen was measured in the same manner as described above.

(Transparency of Stretched Film)

It is an object of the present invention to provide a film excellent in transparency even after being stretched. Here, the total light transmittance and haze of a biaxially-stretched film that will be described below are defined as evaluation indicators of the transparency of a stretched film. According to the present invention, the haze measured for evaluation is 2.0% or less.

(Preparation of Biaxially-Stretched Film and Measurement of Various Physical Properties)

A 13 cm×13 cm test specimen is cut out from a 125 μm-thick unstretched original film, and the test specimen is maintained at a temperature higher by 20° C. than its glass transition temperature for 10 minutes in a state where all the four sides of the test specimen are held. Then, the test specimen is stretched twice (also referred to as "stretched 100%") in two directions at the same time at a rate of 120 mm/min. Thereafter, the thus obtained film was cooled to 23° C., and a sample was taken from the central portion of the film to measure birefringence (orientation birefringence) with the use of an automatic double refraction meter (KOBRA-WR manufactured by Oji Scientific Instruments) at a temperature of 23±2° C., a humidity of 50±5%, a wavelength of 590 nm, and an incidence angle of 0°. At the same time, the in-plane phase difference Re and the thickness-direction phase difference Rth (incidence angle: 40°) of the test specimen were also measured (measurement of in-plane phase difference Re and thickness-direction phase difference Rth has been described above in detail). Further, the total light transmittance and haze of the biaxially-stretched film were also measured in the same manner as described above.

(Evaluation of Mechanical Strength)
(Evaluation of Trimming Property)

The above-described biaxially-stretched film was cut to be 10 cm in length with a cutter. This was performed five times in total, and the number of cracks produced in the film was counted. When the number of cracks is smaller, trimming property and mechanical strength are superior.

(Evaluation of MIT)

The bending resistance of a film was measured by a method specified in JIS C5016 using MIT Folding Endurance Tester manufactured by Toyo Seiki Seisaku-sho, Ltd. The measurement conditions were a measurement angle of 135°, a speed of 175 times/min, an R of 0.38, and a load of 100 g.

(Evaluation of Appearance of Molded Body)

The appearance of a 60 μm-thick film was evaluated according to the following criteria.

○: The film has no surface irregularities, the surface of the film is not a fine rough surface like pearskin, and the thickness variation of the film per meter in MD is 2 μm or less.

X: The film has surface irregularities, the surface of the film is a fine rough surface like pearskin, and the thickness variation of the film per meter in MD is larger than 2 μm.

(Solvent Resistance)

A film having a thickness of 125 μm was used. A solvent of 0.5 mL was dropped onto the film using a Pasteur pipette in an atmosphere of 23° C., and the film was allowed to stand for 1 hour until the solvent was completely volatilized (N=10).

○: Deformation such as appearance of wrinkles or irregularities in surface does not occur.

X: Deformation such as appearance of wrinkles or irregularities in surface occurs.

(Heat Stability)

Heat stability was measured using a thermo gravimetry analyzer (TGA).

SIT EXSTAR 6000, TG/DTA 6300 manufactured by Seiko Instruments Inc. was used. The measurement was performed at a start temperature of 30° C., a final temperature of 460° C., a temperature rise rate of 5° C./min, and a retention time of 0 min. Pellets before film formation were used as a sample. The amount of the sample was 20 mg, and nitrogen was used as a purge gas (400 mL/min).

The temperature of 1 wt % loss was calculated in the following manner.

Weight reduction rate=((wt−wt0)/wt0)×100% wt=weight of sample at the temperature
wt0=reference weight (weight of sample at 40° C.)

The temperature at which the weight reduction rate becomes −1% is defined as the temperature of 1 wt % loss.

Production Example 1

Production of Maleimide Acrylic Resin (A1)

As a maleimide acrylic resin (A1), PM120N (manufactured by Asahi Kasei Chemicals Corp., methyl methacrylate-N-phenylmaleimide-styrene copolymer (81/15/4 wt %)) was used.

Production Example 2

Production of Glutarimide Acrylic Resin (B1)

A glutarimide acrylic resin (B1) was produced using polymethylmethacrylate as a raw material resin and monomethylamine as an imidization agent.

In this production, a tandem-type reactive extruder was used, in which two extrusion reactors were connected in series.

The tandem-type reactive extruder had a first extruder and a second extruder, and both the extruders were intermeshing co-rotating twin screw extruders having a diameter of 75 mm and an L/D ratio (ratio of length (L) to diameter (D) of extruder) of 74. The raw material resin was supplied through the raw material supply port of the first extruder using a loss-in-weight feeder (manufactured by KUBOTA Corporation).

The pressure in each of the vents of the first and second extruders was reduced to −0.095 MPa. Further, the first extruder was connected to the second extruder through a pipe having a diameter of 38 mm and a length of 2 m, and a constant flow pressure valve was used as a system for controlling the pressure in a part connecting the resin discharge port of the first extruder to the raw material supply port of the second extruder.

After the resin (strand) discharged from the second extruder was cooled on a cooling conveyer and cut into pellets by a pelletizer. In order to adjust the pressure in the part connecting the resin discharge port of the first extruder and the raw material supply port of the second extruder or to detect unstable extrusion, resin pressure meters were provided at the discharge port of the first extruder, the center of the part connecting the first and second extruders, and the discharge port of the second extruder.

In the first extruder, an imide resin intermediate 1 was produced using a polymethylmethacrylate resin (Mw: 105000) as a raw material resin and monomethylamine as an imidization agent. At this time, the temperature of maximum temperature portion of the extruder was 280° C., the screw rotation speed of the extruder was 55 rpm, the supply rate of the raw material resin was 150 kg/hr, and the amount of monomethylamine added was 2.0 parts per 100 parts of the raw material resin. The constant flow pressure valve was provided just before the raw material supply port of the second extruder to adjust the pressure in the monomethylamine injection portion of the first extruder to 8 MPa.

In the second extruder, the remaining imidization agent and a by-product were devolatilized through a rear vent and a vacuum vent, and then dimethyl carbonate was added as an esterification agent to produce an imide resin intermediate 2. At this time, the temperature of each barrel of the extruder was 260° C., the screw rotation speed of the extruder was 55 rpm, and the amount of dimethyl carbonate added was 3.2 parts per 100 parts of the raw material resin. Further, the esterification agent was removed through a vent, and then an obtained glutarimide acrylic resin (B1) was extruded through a strand die, cooled in a water tank, and pelletized by a pelletizer.

The obtained glutarimide acrylic resin (B1) is an acrylic resin (B) obtained by copolymerization of a glutarimide unit represented by the general formula (1) and a (meth)acrylic ester unit represented by the general formula (2).

The imidization ratio, glutarimide unit content, acid value, glass transition temperature, and refractive index of the glutarimide acrylic resin (B1) were measured by the above-described methods. As a result, the imidization ratio was 13%, the glutarimide unit content was 7 wt %, the acid value was 0.4 mmol/g, the glass transition temperature was 130° C., and the refractive index was 1.50. The glutarimide acrylic resin (B1) had a negative photoelastic constant.

Production Example 3

Production of Graft Copolymer (E1)

The following materials were fed into a polymerization apparatus having a capacity of 8 liters and equipped with a stirrer.

| | |
|---|---|
| Deionized water | 200 parts |
| Sodium polyoxyethylene lauryl ether phosphate | 0.05 part |
| Sodium formaldehyde sulfoxylate | 0.11 part |
| Disodium ethylenediaminetetraacetate | 0.004 part |
| Ferrous sulfate | 0.001 part |

Air in the polymerization apparatus was sufficiently purged with nitrogen gas so that there was virtually no oxygen in the polymerization apparatus. Then, the temperature in the polymerization apparatus was adjusted to 40° C., and 45.266 parts of a raw material mixture of acrylic rubber particles (E-1) shown in Table 1 was continuously added for 135 minutes. After 12, 24, and 36 minutes from the start of the addition of (E-1), 0.2 part of sodium polyoxyethylene lauryl ether phosphate (sodium salt of polyoxyethylene lauryl ether phosphate (manufactured by TOHO CHEMICAL INDUSTRY Co., Ltd. under the trade name of PHOSPHANOL RD-510Y)) was added each time to the polymerization apparatus. After the addition, polymerization was further continued for 0.5 hour to obtain acrylic rubber particles (polymer (E-1)). The polymerization conversion ratio was 99.4%.

Then, the temperature in the polymerization apparatus was adjusted to 60° C., and 0.2 part of sodium formaldehyde sulfoxylate was fed into the polymerization apparatus. Then, 55.254 parts of a raw material mixture of a hard polymer layer (E-2) shown in Table 1 was continuously added for 165 minutes and polymerization was further continued for 1 hour to obtain a graft copolymer latex. The polymerization conversion ratio was 100.0%. The obtained latex was salted out and coagulated with magnesium sulfate, washed with water, and dried to obtain a white powder of a graft copolymer (E1).

The average particle diameter of rubber particles (polymer E-1) of the graft copolymer (E1) was 133 nm. The graft ratio of the graft copolymer (E1) was 77%.

Production Example 4

Production of Graft Copolymer (E2)

The following materials were fed into a polymerization apparatus having a capacity of 8 liters and equipped with a stirrer.

| | |
|---|---|
| Deionized water | 200 parts |
| Sodium polyoxyethylene lauryl ether phosphate | 0.05 part |
| Sodium formaldehyde sulfoxylate | 0.11 part |
| Disodium ethylenediaminetetraacetate | 0.004 part |
| Ferrous sulfate | 0.001 part |

Air in the polymerization apparatus was sufficiently purged with nitrogen gas so that there was virtually no oxygen in the polymerization apparatus. Then, the temperature in the polymerization apparatus was adjusted to 40° C., and 45.266 parts of a raw material mixture of acrylic rubber particles (E-1) shown in Table 1 was continuously added for 135 minutes. After 12, 37, 62, and 87 minutes from the start of the addition of (E-1), 0.21, 0.21, 0.21, and 0.11 part of sodium polyoxyethylene lauryl ether phosphate (sodium salt of polyoxyethylene lauryl ether phosphate (manufactured by TOHO CHEMICAL INDUSTRY Co., Ltd. under the trade name of PHOSPHANOL RD-510Y)) were added to the polymerization apparatus, respectively. After the addition, polymerization was further continued for 1 hour to obtain acrylic rubber particles (polymer (E-1)). The polymerization conversion ratio was 99.6%.

Then, the temperature in the polymerization apparatus was adjusted to 60° C., and 0.11 part of sodium polyoxyethylene lauryl ether phosphate (sodium salt of polyoxyethylene lauryl ether phosphate (manufactured by TOHO CHEMICAL INDUSTRY Co., Ltd. under the trade name of PHOSPHANOL RD-510Y)) and then 0.2 part of sodium formaldehyde sulfoxylate were fed into the polymerization apparatus. Then, 55.254 parts of a raw material mixture of a hard polymer layer (E-2) shown in Table 1 was continuously added for 165 minutes, and polymerization was further continued for 1 hour to obtain a graft copolymer latex. The polymerization conversion ratio was 99.6%. The obtained latex was salted out and coagulated with magnesium sulfate, washed with water, and dried to obtain a white powder of a graft copolymer (E2).

The average particle diameter of rubber particles (polymer E-1) of the graft copolymer (E2) was 103 nm. The graft ratio of the graft copolymer (E2) was 92%.

TABLE 1

| Multi-Layered Particles (E) | | E1 | E2 |
|---|---|---|---|
| Acrylic cross-linked polymer layer (acrylic rubber particles) (E-1) | Monofunctional monomer content in (E) (parts) | 45 | 45 |
| | Butyl acrylate (%) | 90 | 82 |
| | Methyl methacrylate (%) | 10 | – |
| | Benzyl methacrylate (%) | – | – |
| | Benzyl acrylate (%) | – | – |
| | Styrene (%) | – | 18 |
| | Allyl methacrylate (part) | 0.225 | 0.225 |
| | Cumene hydroperoxide (part) | 0.041 | 0.041 |
| Volume-average particle diameter of (E-1) (nm) | | 133 | 103 |
| Hard polymer layer (E-2) | Monofunctional monomer content in (E) (parts) | 55 | 55 |
| | Methyl methacrylate (%) | 57.8 | 53.1 |
| | Butyl acrylate (%) | 4 | 4 |
| | Benzyl methacrylate (%) | 38.2 | 38.2 |
| | Methacrylic acid (%) | – | 4.7 |
| | t-dodecyl mercaptan (part) | 0 | – |
| | Cumene hydroperoxide (part) | 0.254 | 0.254 |
| Sign of birefringence of multi-layered particles (E) themselves | Orientation birefringence | + | – |
| | Photoelastic constant | + | + |

Examples 1 to 5, Comparative Examples 1 and 2

A mixture of the resin (A), the resin (B), and the multi-layered particles (E) shown in Table 2 was supplied at a rate of 10 kg/hr to a single screw extruder having a full-flight screw with a diameter of 40 mm. The preset temperature of temperature control zone of the extruder was 255° C. and the screw rotation speed of the extruder was 52 rpm. The resin extruded as a strand through a die provided at the outlet of the extruder was cooled in a water tank and pelletized by a pelletizer to obtain pellets.

The obtained pellets were supplied at a rate of 10 kg/hr to a single screw extruder equipped with a leaf disk filter with a pore size of 5 μm and connected to a T-die at the outlet thereof and melt-extruded to obtain a film of Example having a thickness (125 μm, 60 μm) shown in Table 2. The preset temperature of temperature control zone of the extruder was 260° C. and the screw rotation speed of the extruder was 20 rpm. Various physical properties of the film were evaluated.

TABLE 2

| | | | Examples | | | | | Comparative Examples | |
|---|---|---|---|---|---|---|---|---|---|
| | | | 1 | 2 | 3 | 4 | 5 | 1 | 2 |
| | Resin (A) | Type | A1 | A1 | A1 | A1 | A1 | — | A1 |
| | | (parts) | 35 | 31.5 | 30 | 31.5 | 30 | — | 100 |
| | Resin (B) | Type | B1 | B1 | B1 | B1 | B1 | B1 | — |
| | | (parts) | 65 | 58.5 | 50 | 58.5 | 55.7 | 100 | — |
| | Multi-Layered Particles (E) | Type | — | E1 | E1 | E2 | E2 | — | — |
| | | (parts) | — | 10 | 20 | 10 | 14.3 | — | — |
| Film physical properties | Film thickness | (μm) | 125 | 125 | 125 | 125 | 125 | 125 | 125 |
| | Glass transition temperature (DSC) | (° C.) | 129 | 128 | 128 | 128 | 128 | 131 | 125 |
| | Total light transmittance | (%) | 92.4 | 91.5 | 91.1 | 92.1 | 92.1 | 92.1 | 92.4 |
| | Haze value | (%) | 0.4 | 1.1 | 1.3 | 0.6 | 0.8 | 0.3 | 0.25 |
| Unstretched | Photoelastic constant ($\times 10^{-12}$) | ($Pa^{-1}$) | −0.73 | 0.00 | 0.35 | 0.00 | 0.00 | 1.02 | −4.38 |
| | Orientation birefringence ($\times 10^{-4}$) | | ±0.02 | −0.06 | ±0.04 | −0.05 | −0.05 | −0.05 | ±0.04 |
| | Re (per 100 μm) | nm | ±0.2 | −0.6 | ±0.5 | 0.5 | 0.5 | 0.4 | ±0.4 |
| | Rth (per 100 μm) | nm | 1.5 | −2.4 | 1.0 | −1.3 | −1.1 | −0.5 | −0.9 |
| | Heat stability | TGA Temperature of 1 wt % loss (° C.) | 333 | 286 | 286 | 341 | 341 | 329 | 348 |
| 2-fold stretching (uniaxial stretching) | Orientation birefringence ($\times 10^{-4}$) | | −2.01 | −1.70 | −0.92 | −2.35 | −2.54 | −2.93 | 0.05 |
| | Re (per 100 μm) | nm | 20.1 | 17.0 | 9.2 | 15.2 | 15.0 | 29.3 | 0.5 |
| | Rth (per 100 μm) | nm | −12.0 | −9.7 | −2.2 | −7.9 | −6.3 | −13.9 | 0.5 |

TABLE 2-continued

|  |  |  | Examples | | | | | Comparative Examples | |
|---|---|---|---|---|---|---|---|---|---|
|  |  |  | 1 | 2 | 3 | 4 | 5 | 1 | 2 |
| 2-fold stretching (biaxial stretching) | Film thickness | (μm) | 27 | 25 | 29 | 28 | 30 | 24 | 26 |
|  | Orientation birefringence ($\times 10^{-4}$) |  | ±0.08 | −0.14 | −0.17 | 0.49 | ±0.19 | 0.21 | ±0.15 |
|  | Re (per 100 μm) | nm | ±0.8 | 1.4 | 1.7 | 0.7 | ±0.7 | 2.1 | ±1.5 |
|  | Rth (per 100 μm) | nm | 16.7 | 5.0 | 2.8 | −2.1 | −2.0 | 18.7 | −2.2 |
|  | Total light transmittance | (%) | 92.3 | 92.1 | 92.0 | 92.2 | 92.2 | 92.1 | 92.4 |
|  | Haze value | (%) | 0.2 | 0.8 | 1.0 | 0.3 | 0.3 | 0.2 | 0.3 |
|  | Evaluation of trimming property | Number of cracks | 56 | 21 | 4 | 35 | 23 | 62 | 73 |
|  | MIT | Number of times of bending | 1510 | 4194 | 8587 | 4663 | 3381 | 692 | 2209 |
| Evaluation of appearance of molded body |  |  | ◯ | ◯ | ◯ | ◯ | ◯ | ◯ | ◯ |
| Solvent resistance |  |  | ◯ | ◯ | ◯ | ◯ | ◯ | ◯ | ◯ |

\* The symbol "±" means that the sign could not be identified.

As shown in Table 2, the film obtained in Example 1 has high heat stability, high solvent resistance, high transparency, low orientation birefringence, low photoelastic constant, and excellent optical isotropy. Further, the films obtained in Examples 2 to 5 are excellent also in mechanical strength in addition to excellent characteristics that the film obtained in Example 1 has.

The invention claimed is:

1. An optical resin composition comprising:
  a resin (A) having a maleimide unit represented by the following general formula (5) and a (meth)acrylic ester unit; and
  a glutarimide acrylic resin (B):

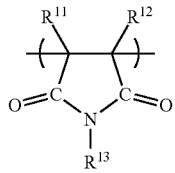

(5)

wherein $R^{11}$ and $R^{12}$ are each independently a hydrogen atom, an alkyl group having 1 to 12 carbon atoms, or an aryl group having 6 to 14 carbon atoms, and
$R^{13}$ is a hydrogen atom, an arylalkyl group having 7 to 14 carbon atoms, an aryl group having 6 to 14 carbon atoms, a cycloalkyl group having 3 to 12 carbon atoms, an alkyl group having 1 to 18 carbon atoms, or an aryl group having 6 to 14 carbon atoms or an alkyl group having 1 to 12 carbon atoms which has at least one substituent group selected from the following group A,
  group A: halogen atom, hydroxyl group, nitro group, alkoxy group having 1 to 12 carbon atoms, alkyl group having 1 to 12 carbon atoms, and arylalkyl group having 7 to 14 carbon atoms.

2. The optical resin composition according to claim 1, wherein the glutarimide acrylic resin (B) has a unit represented by the following general formula (1):

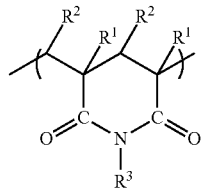

(1)

wherein $R^1$ and $R^2$ are each independently hydrogen or an alkyl group having 1 to 8 carbon atoms and $R^3$ is hydrogen, an alkyl group having 1 to 18 carbon atoms, a cycloalkyl group having 3 to 12 carbon atoms, or an aromatic ring-containing substituent group having 5 to 15 carbon atoms; and a unit represented by the following general formula (2):

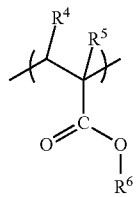

(2)

wherein $R^4$ and $R^5$ are each independently hydrogen or an alkyl group having 1 to 8 carbon atoms and $R^6$ is an alkyl group having 1 to 18 carbon atoms, a cycloalkyl group having 3 to 12 carbon atoms, or an aromatic ring-containing substituent group having 5 to 15 carbon atoms.

3. The optical resin composition according to claim 1, wherein the resin (A) further has a unit represented by the following general formula (3):

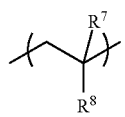

(3)

wherein $R^7$ is hydrogen or an alkyl group having 1 to 8 carbon atoms and $R^8$ is an aryl group having 6 to 10 carbon atoms.

4. The optical resin composition according to claim 1, which contains the resin (A) in an amount of 1 to 99 parts by weight per 100 parts by weight of a total amount of the resin (A) and the resin (B).

5. The optical resin composition according to claim 1, further comprising multi-layered particles.

6. The optical resin composition according to claim 5, wherein the multi-layered particles are acrylic rubber particles.

7. The optical resin composition according to claim 1, wherein a photoelastic constant of the resin (A) and a photoelastic constant of the glutarimide acrylic resin (B) are opposite in sign.

8. The optical resin composition according to claim 1, wherein an orientation birefringence of the resin (A) and an orientation birefringence of the glutarimide acrylic resin (B) are opposite in sign.

9. The optical resin composition according to claim 1, wherein when a molded body (thickness: 125 μm) of a mixed resin comprising the resin (A) and the glutarimide acrylic resin (B) is prepared, the molded body has a haze of 2% or less.

10. The optical resin composition according to claim 1, wherein a photoelastic constant of a mixed resin comprising the resin (A) and the glutarimide acrylic resin (B) is $-10\times10^{-12}$ to $+10\times10^{-12}$ Pa$^{-1}$.

11. The optical resin composition according to claim 1, wherein an orientation birefringence of a mixed resin comprising the resin (A) and the glutarimide acrylic resin (B) is $-15\times10^{-4}$ to $+15\times10^{-4}$.

12. The optical resin composition according to claim 5, wherein the multi-layered particles have a polymer layer containing, as a structural unit, a monomer represented by the following formula (4):

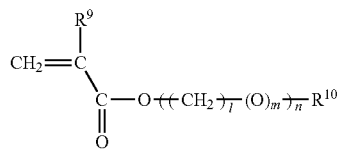
(4)

wherein 1 is an integer of 1 to 4, m is an integer of 0 or 1, n is an integer of 0 to 10, $R^9$ is a hydrogen atom or a substituted or unsubstituted linear or branched alkyl group having 1 to 12 carbon atoms, and $R^{10}$ is a substituted or unsubstituted aromatic group having 1 to 24 carbon atoms or a substituted or unsubstituted alicyclic group having 1 to 24 carbon atoms and has a homocyclic structure or a heterocyclic structure.

13. The optical resin composition according to claim 12, wherein the polymer layer contains, as a structural unit, (meth)acrylic acid and/or a salt thereof.

14. The optical resin composition according to claim 1, wherein a molded body (125 μm thick) made of the optical resin composition has a total light transmittance of 85% or more.

15. The optical resin composition according to claim 1, wherein a molded body (125 μm thick) made of the optical resin composition has a haze of 2% or less.

16. A pellet obtained by heat-melting the optical resin composition according to claim 1.

17. A molded body made of the optical resin composition according to claim 1.

18. A film made of the optical resin composition according to claim 1.

19. The film according to claim 18, which is formed by melt-extrusion molding.

20. The film according to claim 18, which has a thickness of 10 to 500 μm.

21. The film according to claim 18, which is an optical film.

22. A stretched film obtained by stretching the film according to claim 18.

23. The stretched film according to claim 22, which has a thickness of 10 to 500 μm.

24. The stretched film according to claim 22, which has a photoelastic constant of $-4\times10^{-12}$ to $4\times10^{-12}$ Pa$^{-1}$.

25. The stretched film according to claim 22, which has an orientation birefringence of $-5\times10^{-4}$ to $5\times10^{-4}$.

* * * * *